(12) United States Patent
Wolas et al.

(10) Patent No.: US 10,589,647 B2
(45) Date of Patent: Mar. 17, 2020

(54) SYSTEMS AND METHODS FOR CLIMATE CONTROLLED SEATS

(71) Applicant: GENTHERM INCORPORATED, Northville, MI (US)

(72) Inventors: Scott Richard Wolas, Newbury Park, CA (US); Michael Maass, Ypsilanti, MI (US)

(73) Assignee: GENTHERM INCORPORATED, Northville, MI (US)

(*) Notice: Subject to any disclaimer, the term of this patent is extended or adjusted under 35 U.S.C. 154(b) by 774 days.

(21) Appl. No.: 15/101,854

(22) PCT Filed: Dec. 5, 2014

(86) PCT No.: PCT/US2014/068751
§ 371 (c)(1),
(2) Date: Jun. 3, 2016

(87) PCT Pub. No.: WO2015/085150
PCT Pub. Date: Jun. 11, 2015

(65) Prior Publication Data
US 2016/0304013 A1    Oct. 20, 2016

Related U.S. Application Data

(60) Provisional application No. 61/913,114, filed on Dec. 6, 2013, provisional application No. 61/912,485, filed on Dec. 5, 2013.

(51) Int. Cl.
*B60N 2/56* (2006.01)
*B60H 1/00* (2006.01)
*B60N 2/00* (2006.01)

(52) U.S. Cl.
CPC ....... *B60N 2/5657* (2013.01); *B60H 1/00285* (2013.01); *B60N 2/56* (2013.01); *B60N 2/00* (2013.01)

(58) Field of Classification Search
USPC .................. 219/494, 202, 219, 497, 505
See application file for complete search history.

(56) References Cited

U.S. PATENT DOCUMENTS 1,541,213 A    6/1925    Harley
2,782,834 A    2/1957    Vigo
(Continued)

FOREIGN PATENT DOCUMENTS

CN    2079462    6/1991
CN    2155741    2/1994
(Continued)

OTHER PUBLICATIONS

U.S. Appl. No. 14/864,704, filed Sep. 24, 2015, Terech et al.
(Continued)

*Primary Examiner* — Phuong T Nguyen
(74) *Attorney, Agent, or Firm* — Knobbe, Martens, Olson & Bear, LLP

(57) ABSTRACT

A method for thermally conditioning a space adjacent a seat assembly includes activating a heating element positioned within the seat assembly beneath a seat covering. A fluid module that includes a fluid supply device and a thermoelectric element is activated to direct heated air from the fluid module to a space adjacent the seat assembly through a distribution system formed at least partially in the seat cushion. After a period of time, the heating element is deactivated.

25 Claims, 21 Drawing Sheets

(56) References Cited

U.S. PATENT DOCUMENTS

| | | |
|---|---|---|
| 2,826,135 A | 3/1958 | Benzick |
| 2,912,832 A | 11/1959 | Clark |
| 2,978,972 A | 4/1961 | Hake |
| 2,992,604 A | 7/1961 | Trotman et al. |
| 3,030,145 A | 4/1962 | Kottemann |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,550,523 A | 12/1970 | Segal |
| 3,681,797 A | 8/1972 | Messner |
| 3,785,165 A | 1/1974 | Valenzuela, Jr. |
| 3,818,522 A | 6/1974 | Schuster |
| 4,002,108 A | 1/1977 | Drori |
| 4,065,936 A | 1/1978 | Fenton et al. |
| 4,379,352 A | 4/1983 | Hauslein et al. |
| 4,413,857 A | 11/1983 | Hayashi |
| 4,437,702 A | 3/1984 | Agosta |
| 4,563,387 A | 1/1986 | Takagi et al. |
| 4,567,351 A | 1/1986 | Kitagawa et al. |
| 4,572,430 A | 2/1986 | Takagi et al. |
| 4,671,567 A | 6/1987 | Frobose |
| 4,685,727 A | 8/1987 | Cremer et al. |
| 4,686,724 A | 8/1987 | Bedford |
| 4,777,802 A | 10/1988 | Feher |
| 4,847,933 A | 7/1989 | Bedford |
| 4,923,248 A | 5/1990 | Feher |
| 4,981,324 A | 1/1991 | Law |
| 5,002,336 A | 3/1991 | Feher |
| 5,016,302 A | 5/1991 | Yu |
| 5,077,709 A | 12/1991 | Feher |
| 5,088,790 A | 2/1992 | Wainwright et al. |
| 5,106,161 A | 4/1992 | Meiller |
| 5,117,638 A | 6/1992 | Feher |
| 5,172,564 A | 12/1992 | Reedy |
| 5,226,188 A | 7/1993 | Liou |
| 5,256,857 A | 10/1993 | Curhan et al. |
| 5,385,382 A | 1/1995 | Single, II et al. |
| 5,505,520 A | 4/1996 | Frusti et al. |
| 5,524,439 A | 6/1996 | Gallup et al. |
| 5,597,200 A | 1/1997 | Gregory et al. |
| 5,606,639 A | 2/1997 | Lehoe et al. |
| 5,626,021 A | 5/1997 | Karunasiri et al. |
| 5,645,314 A | 7/1997 | Liou |
| 5,850,741 A | 12/1998 | Feher |
| 5,887,304 A | 3/1999 | Von der Heyde |
| 5,921,314 A | 7/1999 | Schuller et al. |
| 5,924,766 A | 7/1999 | Esaki et al. |
| 5,927,599 A | 7/1999 | Kath |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,079,485 A * | 6/2000 | Esaki ............ B60H 1/00285 165/42 |
| 6,085,369 A | 7/2000 | Feher |
| 6,119,463 A | 9/2000 | Bell |
| 6,145,925 A | 11/2000 | Eksin et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,196,627 B1 | 3/2001 | Faust et al. |
| 6,206,465 B1 | 3/2001 | Faust et al. |
| 6,223,539 B1 | 5/2001 | Bell |
| 6,263,530 B1 | 7/2001 | Feher |
| 6,291,803 B1 | 9/2001 | Fourrey |
| 6,474,072 B2 | 11/2002 | Needham |
| 6,481,801 B1 | 11/2002 | Schmale |
| 6,509,704 B1 | 1/2003 | Brown |
| 6,541,737 B1 | 4/2003 | Eksin et al. |
| RE38,128 E | 6/2003 | Gallup et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,619,737 B2 | 9/2003 | Kunkel et al. |
| 6,626,488 B2 | 9/2003 | Pfahler |
| 6,644,735 B2 | 11/2003 | Bargheer et al. |
| 6,676,207 B2 | 1/2004 | Rauh et al. |
| 6,685,553 B2 | 2/2004 | Aoki |
| 6,695,402 B2 | 2/2004 | Sloan, Jr. |
| 6,700,052 B2 | 3/2004 | Bell |
| 6,739,655 B1 | 5/2004 | Schwochert et al. |
| 6,761,399 B2 | 7/2004 | Bargheer et al. |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,808,230 B2 | 10/2004 | Buss et al. |
| 6,828,528 B2 | 12/2004 | Stowe et al. |
| 6,841,957 B2 | 1/2005 | Brown |
| 6,855,880 B2 | 2/2005 | Feher |
| 6,857,697 B2 | 2/2005 | Brennan et al. |
| 6,892,807 B2 | 5/2005 | Fristedt et al. |
| 6,893,086 B2 | 5/2005 | Bajic et al. |
| 6,907,739 B2 | 6/2005 | Bell |
| 6,954,944 B2 | 10/2005 | Feher |
| 6,976,734 B2 | 12/2005 | Stoewe |
| 7,040,710 B2 | 5/2006 | White et al. |
| 7,070,232 B2 | 7/2006 | Minegishi et al. |
| 7,108,319 B2 | 9/2006 | Hartwich et al. |
| 7,114,771 B2 | 10/2006 | Lofy et al. |
| 7,124,593 B2 | 10/2006 | Feher |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,213,876 B2 | 5/2007 | Stoewe |
| 7,261,372 B2 | 8/2007 | Aoki |
| 7,272,936 B2 | 9/2007 | Feher |
| 7,338,117 B2 | 3/2008 | Iqbal et al. |
| 7,425,034 B2 | 9/2008 | Bajic et al. |
| 7,462,028 B2 | 12/2008 | Cherala et al. |
| 7,475,464 B2 | 1/2009 | Lofy et al. |
| 7,480,950 B2 | 1/2009 | Feher |
| 7,506,938 B2 | 3/2009 | Brennan et al. |
| 7,587,901 B2 | 9/2009 | Petrovski |
| 7,591,507 B2 | 9/2009 | Giffin et al. |
| 7,607,739 B2 | 10/2009 | Browne et al. |
| 7,640,754 B2 | 1/2010 | Wolas |
| 7,665,803 B2 | 2/2010 | Wolas |
| 7,708,338 B2 | 5/2010 | Wolas |
| RE41,765 E | 9/2010 | Gregory et al. |
| 7,827,620 B2 | 11/2010 | Feher |
| 7,827,805 B2 * | 11/2010 | Comiskey ............ B60N 2/5635 62/244 |
| 7,862,113 B2 | 1/2011 | Knoll |
| 7,866,017 B2 | 1/2011 | Knoll |
| 7,877,827 B2 | 2/2011 | Marquette et al. |
| 7,937,789 B2 | 5/2011 | Feher |
| 7,963,594 B2 | 6/2011 | Wolas |
| 7,966,835 B2 | 6/2011 | Petrovski |
| 7,996,936 B2 | 8/2011 | Marquette et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |

(56) References Cited

U.S. PATENT DOCUMENTS

| | | |
|---|---|---|
| 8,575,518 B2 | 11/2013 | Walsh |
| 8,621,687 B2 | 1/2014 | Brykalski et al. |
| 8,732,874 B2 | 5/2014 | Brykalski et al. |
| 8,777,320 B2 | 7/2014 | Stoll et al. |
| 8,782,830 B2 | 7/2014 | Brykalski et al. |
| 8,893,329 B2 | 11/2014 | Petrovksi |
| 8,969,703 B2 | 3/2015 | Makansi et al. |
| 9,055,820 B2 | 6/2015 | Axakov et al. |
| 9,105,808 B2 | 8/2015 | Petrovksi |
| 9,105,809 B2 | 8/2015 | Lofy |
| 9,121,414 B2 | 9/2015 | Lofy et al. |
| 9,125,497 B2 | 9/2015 | Brykalski et al. |
| 9,335,073 B2 | 5/2016 | Lofy |
| 9,603,459 B2 | 3/2017 | Brykalski et al. |
| 9,622,588 B2 | 4/2017 | Brykalski et al. |
| 9,651,279 B2 | 5/2017 | Lofy |
| 9,662,962 B2 | 5/2017 | Steinman et al. |
| 9,685,599 B2 | 6/2017 | Petrovski et al. |
| 9,814,641 B2 | 11/2017 | Brykalski et al. |
| 9,989,267 B2 | 6/2018 | Brykalski et al. |
| 9,989,282 B2 | 6/2018 | Makansi et al. |
| 10,005,337 B2 | 6/2018 | Petrovski |
| 10,195,970 B2 | 2/2019 | Bauer |
| 10,219,323 B2 | 2/2019 | Inaba et al. |
| 10,228,165 B2 | 3/2019 | Makansi et al. |
| 10,266,031 B2 | 4/2019 | Steinman et al. |
| 10,288,084 B2 | 5/2019 | Lofy et al. |
| RE47,574 E | 8/2019 | Terech et al. |
| 2002/0011071 A1 | 1/2002 | Needham |
| 2002/0017102 A1 | 2/2002 | Bell |
| 2002/0166659 A1* | 11/2002 | Wagner ............ G05D 23/1919 165/254 |
| 2002/0195844 A1 | 12/2002 | Hipwell |
| 2003/0039298 A1 | 2/2003 | Eriksson et al. |
| 2003/0145380 A1 | 8/2003 | Schmid |
| 2004/0036326 A1* | 2/2004 | Bajic ............... B60N 2/56 297/180.14 |
| 2004/0070236 A1 | 4/2004 | Brennan et al. |
| 2004/0090093 A1 | 5/2004 | Kamiya et al. |
| 2004/0195870 A1 | 10/2004 | Bohlender |
| 2004/0255364 A1 | 12/2004 | Feher |
| 2005/0067862 A1 | 3/2005 | Iqbal et al. |
| 2005/0140180 A1 | 6/2005 | Hesch |
| 2005/0202774 A1 | 9/2005 | Lipke |
| 2005/0285438 A1 | 12/2005 | Ishima et al. |
| 2006/0053529 A1 | 3/2006 | Feher |
| 2006/0087160 A1 | 4/2006 | Dong et al. |
| 2006/0137099 A1 | 6/2006 | Feher |
| 2006/0137358 A1 | 6/2006 | Feher |
| 2006/0175877 A1 | 8/2006 | Alionte et al. |
| 2006/0197363 A1 | 9/2006 | Lofy et al. |
| 2006/0214480 A1 | 9/2006 | Terech |
| 2006/0244289 A1 | 11/2006 | Bedro |
| 2006/0273646 A1 | 12/2006 | Comiskey et al. |
| 2006/0284455 A1 | 12/2006 | Terech |
| 2007/0001489 A1 | 1/2007 | Terech |
| 2007/0040421 A1 | 2/2007 | Zuzga et al. |
| 2007/0069554 A1* | 3/2007 | Comiskey ............ B60N 2/5635 297/180.12 |
| 2007/0086757 A1 | 4/2007 | Feher |
| 2007/0158981 A1 | 7/2007 | Almasi et al. |
| 2007/0200398 A1 | 8/2007 | Wolas et al. |
| 2007/0251016 A1 | 11/2007 | Feher |
| 2007/0262621 A1 | 11/2007 | Dong et al. |
| 2008/0000025 A1 | 1/2008 | Feher |
| 2008/0087316 A1 | 4/2008 | Inaba et al. |
| 2008/0164733 A1 | 7/2008 | Giffin et al. |
| 2008/0166224 A1 | 7/2008 | Giffin et al. |
| 2009/0000031 A1 | 1/2009 | Feher |
| 2009/0015027 A1 | 1/2009 | Lambarth et al. |
| 2009/0026813 A1 | 1/2009 | Lofy |
| 2009/0033130 A1 | 2/2009 | Marquette et al. |
| 2009/0126110 A1 | 5/2009 | Feher |
| 2009/0211619 A1 | 8/2009 | Sharp et al. |
| 2009/0218855 A1 | 9/2009 | Wolas |
| 2010/0282910 A1* | 11/2010 | Stothers ............ H02J 3/14 244/134 D |
| 2010/0290215 A1 | 11/2010 | Metcalf et al. |
| 2010/0294455 A1 | 11/2010 | Yang et al. |
| 2011/0226751 A1 | 9/2011 | Lazanja et al. |
| 2011/0260681 A1 | 10/2011 | Guccione et al. |
| 2011/0271994 A1 | 11/2011 | Gilley |
| 2012/0049586 A1 | 3/2012 | Yoshimoto et al. |
| 2012/0080911 A1 | 4/2012 | Brykalski et al. |
| 2012/0117730 A1 | 5/2012 | Lemire et al. |
| 2012/0129439 A1 | 5/2012 | Ota et al. |
| 2012/0198616 A1 | 8/2012 | Makansi et al. |
| 2012/0228904 A1 | 9/2012 | Mouradian |
| 2012/0235444 A1 | 9/2012 | Dilley et al. |
| 2012/0261399 A1 | 10/2012 | Lofy |
| 2013/0008181 A1 | 1/2013 | Makansi et al. |
| 2013/0086923 A1 | 4/2013 | Petrovski et al. |
| 2013/0097776 A1 | 4/2013 | Brykalski et al. |
| 2013/0097777 A1 | 4/2013 | Marquette et al. |
| 2013/0206852 A1 | 8/2013 | Brykalski et al. |
| 2013/0232996 A1 | 9/2013 | Goenka et al. |
| 2013/0239592 A1 | 9/2013 | Lofy |
| 2013/0278075 A1 | 10/2013 | Kurs et al. |
| 2014/0007594 A1 | 1/2014 | Lofy |
| 2014/0026320 A1 | 1/2014 | Marquette et al. |
| 2014/0030082 A1 | 1/2014 | Helmenstein |
| 2014/0041396 A1 | 2/2014 | Makansi et al. |
| 2014/0062392 A1 | 3/2014 | Lofy et al. |
| 2014/0090513 A1 | 4/2014 | Zhang et al. |
| 2014/0090829 A1 | 4/2014 | Petrovski |
| 2014/0113536 A1 | 4/2014 | Goenka et al. |
| 2014/0131343 A1 | 5/2014 | Walsh |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0237719 A1 | 8/2014 | Brykalski et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0310874 A1 | 10/2014 | Brykalski et al. |
| 2014/0338366 A1 | 11/2014 | Adldinger et al. |
| 2015/0013346 A1 | 1/2015 | Lofy |
| 2015/0121902 A1 | 5/2015 | Steinman |
| 2016/0053772 A1 | 2/2016 | Lofy et al. |
| 2016/0133817 A1 | 5/2016 | Makansi et al. |
| 2016/0152167 A1 | 6/2016 | Kozlowski |
| 2017/0135490 A1 | 5/2017 | Andrix et al. |
| 2017/0181225 A1 | 6/2017 | Inaba et al. |
| 2017/0261241 A1 | 9/2017 | Makansi et al. |
| 2017/0282764 A1 | 10/2017 | Bauer et al. |
| 2017/0291467 A1 | 10/2017 | Steinman et al. |
| 2017/0354190 A1 | 12/2017 | Cauchy |
| 2018/0017334 A1 | 1/2018 | Davis et al. |
| 2018/0076375 A1 | 3/2018 | Makansi et al. |
| 2018/0111527 A1 | 4/2018 | Tait et al. |
| 2018/0281641 A1 | 10/2018 | Durkee et al. |
| 2019/0230744 A1 | 7/2019 | Inaba et al. |
| 2019/0239289 A1 | 8/2019 | Inaba et al. |

FOREIGN PATENT DOCUMENTS

| | | |
|---|---|---|
| CN | 1121790 | 5/1996 |
| CN | 1813164 | 8/2006 |
| CN | 1839060 | 9/2006 |
| CN | 1929761 | 3/2007 |
| CN | 101 331 034 | 12/2008 |
| CN | 101 370 409 | 2/2009 |
| CN | 101 551 638 | 8/2009 |
| CN | 101 663 180 | 3/2010 |
| CN | 101 871 704 | 10/2010 |
| CN | 102 059 968 | 5/2011 |
| CN | 201 987 052 | 9/2011 |
| CN | 102 576 232 | 7/2012 |
| CN | 102 729 865 | 10/2012 |
| DE | 102 38 552 | 8/2001 |
| DE | 101 15 242 | 10/2002 |
| DE | 201 20 516 | 4/2003 |

(56) References Cited

FOREIGN PATENT DOCUMENTS

| | | |
|---|---|---|
| DE | 10 2009 058 996 | 12/2012 |
| EP | 0 411 375 | 5/1994 |
| EP | 0 730 720 B1 | 5/2000 |
| EP | 1 675 747 | 3/2017 |
| JP | 53-080603 U | 7/1978 |
| JP | 54-097212 U | 7/1979 |
| JP | 58-185952 | 10/1983 |
| JP | 60-012095 | 1/1985 |
| JP | 61-194354 U | 12/1986 |
| JP | 62-107762 | 7/1987 |
| JP | 62-191212 | 8/1987 |
| JP | 63-178548 | 11/1988 |
| JP | 64-030042 | 2/1989 |
| JP | 01-172012 | 7/1989 |
| JP | 04-107656 | 9/1992 |
| JP | 05-000623 | 1/1993 |
| JP | 05-023235 | 2/1993 |
| JP | 05-010700 Y2 | 3/1993 |
| JP | 05-213056 | 8/1993 |
| JP | 05-277020 | 10/1993 |
| JP | 09-37894 | 2/1997 |
| JP | 10-503733 | 4/1998 |
| JP | 10-297243 | 11/1998 |
| JP | 2003-042594 | 2/2003 |
| JP | 2003-254636 | 9/2003 |
| JP | 2012-111318 | 6/2012 |
| KR | 10-1998-0702159 | 7/1998 |
| KR | 10-1254624 | 4/2013 |
| WO | WO 96/005475 | 2/1996 |
| WO | WO 02/011968 | 2/2002 |
| WO | WO 02/053400 | 7/2002 |
| WO | WO 03/014634 | 2/2003 |
| WO | WO 03/051666 | 6/2003 |
| WO | WO 2006/078394 | 7/2006 |
| WO | WO 2007/142972 | 12/2007 |
| WO | WO 2008/057962 | 5/2008 |
| WO | WO 2009/036077 | 3/2009 |
| WO | WO 2010/088405 | 8/2010 |
| WO | WO 2010/137290 | 12/2010 |
| WO | WO 2015/085150 | 6/2015 |
| WO | WO 2015/123585 | 8/2015 |
| WO | WO 2015/191819 | 12/2015 |
| WO | WO 2016/130840 | 8/2016 |
| WO | WO 2017/106829 | 6/2017 |
| WO | WO 2017/201083 | 11/2017 |
| WO | WO 2018/071612 | 4/2018 |
| WO | WO 2018/148398 | 8/2018 |
| WO | WO 2018/175506 | 9/2018 |

OTHER PUBLICATIONS

U.S. Appl. No. 15/118,441, filed Aug. 11, 2016, Inaba et al.
Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
Lofy et al., "Thermoelectrics for Environmental Control in Automobiles", Proceeding of Twenty-First International Conference on Thermoelectrics (ICT 2002), 2002, pp. 471-476.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
International Search Report and Written Opinion received in PCT Application No. PCT/US2014/068751, dated Mar. 2, 2015.
U.S. Appl. No. 15/317,757, filed Dec. 9, 2016, Andrix et al.
U.S. Appl. No. 15/495,787, filed Apr. 24, 2017, Steinman et al.
International Preliminary Report on Patentability received in PCT Application No. PCT/US2014/068751, dated Jun. 16, 2016.
U.S. Appl. No. 16/255,711, filed Jan. 23, 2019, Inaba et al.

* cited by examiner

SYSTEMS AND METHODS FOR CLIMATE CONTROLLED SEATS

INCORPORATION BY REFERENCE TO ANY PRIORITY APPLICATIONS

This application is the U.S. National Phase under 35 U.S.C. § 371 of International Application No. PCT/US2014/068751, filed Dec. 5, 2014, which claims the benefit of U.S. Provisional Patent Application No. 61/912,485, filed Dec. 5, 2013 and U.S. Provisional Patent Application No. 61/913,114, filed Dec. 6, 2013, the entireties of both of which are hereby expressly incorporated by reference herein and made a part of this specification.

Any and all applications for which a foreign or domestic priority claim is identified in the Application Data Sheet as filed with the present application are hereby incorporated by reference under 37 CFR 1.57.

BACKGROUND

Field

This application generally relates to temperature control, and more specifically, to temperature control of a seat assembly.

Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period, can cause the vehicle seat to be very hot and uncomfortable for the occupant for some time after entering and using the vehicle, even with normal air conditioning. Furthermore, even with normal air-conditioning, on a hot day, the occupant's back and other pressure points may remain sweaty while seated. In the winter, it is highly desirable to have the ability to warm the seat of the occupant quickly to facilitate the occupant's comfort, especially where the normal vehicle heater is unlikely to warm the vehicle's interior as quickly.

For such reasons, there have been various types of individualized temperature control systems for vehicle seats. Such temperature control systems typically include a distribution system comprising a combination of channels and passages formed in the back and/or seat cushions of the seat. A thermal module thermally conditions the air and delivers the conditioned air to the channels and passages. The conditioned air flows through the channels and passages to cool or heat the space adjacent the surface of the vehicle seat.

Thus, there is a need for an improved temperature control apparatuses and methods for a climate control system for vehicle seats and other seating assemblies.

SUMMARY

Accordingly, one aspect of the present application comprises a method for thermally conditioning a space adjacent a seat assembly that includes a support structure that defines a support surface. The method includes the steps of during a first conditioning mode or period, activating a conductive heating element positioned within, along, or below the support surface until a first target temperature is reached, thereby conductively heating the support surface; during a second conditioning mode or period, activating a fluid module that includes a fluid supply device and a convective temperature conditioning device until a second target temperature is reached; directing heated air from the fluid module to the support surface through a distribution system formed at least partially in the seat cushion to convectively heat a space adjacent the support surface; and when the first target desired temperature is reached, deactivating the conductive heating element; wherein the first conditioning mode or period generally precedes or is used concurrently with the second conditioning mode or period; and wherein the conductive heating element is configured to be cycled between at least two different levels during operation of the second conditioning mode or period. In some embodiments, the conductive heating element is a resistive heating element. In some embodiments, the conductive heating element is configured to provide more thermal energy than the fluid module. In some embodiments, the convective temperature conditioning device includes a thermoelectric element. In some embodiments, the seat assembly is located within a vehicle. In some embodiments, the method further includes the steps of activating, using a control module, at least one of the conductive heating element, the fluid supply device and the convective temperature conditioning device when a temperature adjacent the seat assembly falls below a target desired temperature. In some embodiments, activating a conductive heating element comprises activating a resistive heater. In some embodiments, the method further includes the step of generating heat within a space generally beneath the seat covering of the seat assembly using at least one of the conductive heating element, the fluid supply device and the convective temperature conditioning device. In some embodiments, the method further includes the step of generating heat within a space generally beneath the seat covering of the seat assembly and generally above the seat cushion of the seat assembly using at least one of the conductive heating element, the fluid supply device and the convective temperature conditioning device. In some embodiments, the step of activating the fluid module begins at least 60 seconds after the heating element has been activated. In some embodiments, the step of activating the fluid module begins at least 120 seconds after the heating element has been activated. In some embodiments, the step of activating the fluid module begins after the heating element has been deactivated. In some embodiments, the steps of activating the conductive heating element and activating the fluid module occur substantially simultaneously. In some embodiments, the conductive heating element and the fluid module are both activated during a period of time and during the period of time the total current supplied to the conductive heating element and the climate control device remains substantially constant. In some embodiments, if an ambient temperature is less than a threshold temperature, the seat assembly is configured to concurrently operate under both the first conditioning mode or period and the second conditioning mode or period; and if the ambient temperature is above the threshold temperature, the seat assembly is configured to operate one of the first conditioning mode or period and the second conditioning mode or period. In some embodiments, when the first and second conditioning modes or periods are operating concurrently with one another and if the ambient temperature rises above the threshold temperature, the seat assembly is configured to begin cycling operating between the first conditioning mode or period and the second conditioning mode or period. In some embodiments, the method further includes the steps of measuring a total power consumed by the conductive heating element, the fluid supply device and the convective temperature conditioning device; and deactivating at least one of the conductive heating element, the fluid supply device and the convective temperature conditioning device when the total power exceeds a predetermined power.

Another aspect of the present application comprises a method of thermally conditioning a climate controlled seat assembly using feedback control, the method including the steps of receiving instructions from an occupant regarding a desired operational setting for the seat assembly; sensing a temperature associated with a level of thermal conditioning occurring at the seat assembly using at least one temperature sensor; providing the desired operational setting and the sensed temperature to a control module; wherein the control module is adapted to selectively regulate a heating element and a fluid module to thermally condition a space adjacent the seat assembly based on the desired operational setting and the sensed temperature, the fluid module comprising a fluid transfer device and a thermoelectric device; and activating or deactivating at least one of the heating element, the fluid transfer device and the thermoelectric device using the control module; wherein the heating element is positioned near a support surface of the seat assembly and is configured to conductively heat the support surface; wherein the fluid module is configured to selectively direct heated or cooled air through a fluid distribution system at least partially formed within a seat cushion of the seat assembly to convectively heat or cool a space adjacent the support surface; wherein the control module is adapted to selectively activate or deactivate at least one of the heating element, the fluid transfer device and the thermoelectric device to maintain the desired operational setting; and wherein the control module is configured to receive a signal that indicates a status of an ignition system of the vehicle, the control module being adapted to activate at least one of the heating element, the fluid transfer device and the thermoelectric device when the ignition system is turned on. In some embodiments, the desired operational setting for the claim controlled seat assembly corresponds to a general temperature setting. In some embodiments, the desired operational setting for the claim controlled seat assembly corresponds to a specific temperature or temperature range. In some embodiments, the seat assembly comprises a seat back portion and a seat bottom portion, wherein the desired operational setting for the seat back portion is different that the desired operational setting for the seat bottom portion.

Yet another aspect of the present application comprises a method of thermally conditioning a climate controlled seat assembly using feedback control, the method including the steps of receiving instructions from an occupant regarding a desired operational setting for the seat assembly; sensing a temperature associated with a level of thermal conditioning occurring at the seat assembly using at least one temperature sensor; providing the desired operational setting and a sensed temperature to a control module; selectively regulating a heating element and a fluid module to thermally condition a space adjacent the seat assembly using the control module, the fluid module comprising a fluid transfer device and a thermoelectric device; and operating at least one of the heating element and the fluid module in a heating mode of operation when the sensed temperature is less than a desired set point temperature; operating at least one of the heating element and the fluid module in a cooling mode of operation when the sensed temperature is more than the desired set point temperature; switching operation of at least one of the heating element and the fluid module from a heating mode of operation to a cooling mode of operation when the sensed temperature exceeds the desired set point temperature by a predetermined delta for a predetermined time period; and switching operation from a cooling mode of operation to a heating mode of operation when the sensed temperature is below the desired set point temperature by a predetermined delta for a predetermined time period. In some embodiments, the predetermined delta is 2 degrees Celsius. In some embodiments, the predetermined time period is 6 seconds. In some embodiments, the heating element is operated alone until a measured temperature of the heating element reaches a predetermined target temperature. In some embodiments, the predetermined target temperature is within a predetermined temperature offset of the desired set point temperature. In some embodiments, the predetermined temperature offset is 20 degrees Celsius. In some embodiments, operation of the heating element is discontinued and operation of the fluid module is initiated when the predetermined target temperature is reached. In some embodiments, operation of the heating element is discontinued the fluid module is in operation.

Another aspect of the present application comprises a climate controlled seat assembly, including a seat cushion having an outer surface; a supply passage extending through the seat cushion, the supply passage comprising an inlet; a distribution system comprising at least one distribution passage configured to distribute air along the support surface of the seat cushion, the distribution system communicating with the supply passage; a seat covering positioned over the outer surface of the seat cushion; a heat source positioned between the seat covering and the inlet to the supply passage; a fluid module operatively connected to the inlet of the supply passage, the fluid module including a fluid transfer device configured to move air between the distribution system and the supply passage; a thermoelectric device configured to heat the air moved by the fluid module; and a control system configured to operate the heat source, the fluid module and the thermoelectric device, upon receiving an input signal generated by a user, in one or both of a first conditioning mode and a second conditioning mode to provide heated or cooled air to the outer surface of the seat cushion wherein when the first and second conditioning modes are operating concurrently with one another and if an ambient temperature rises above a threshold temperature, the control system is configured to begin cycling operation between the first conditioning mode and the second conditioning mode. In some embodiments, the control system is configured to activate the fluid module after the heat source has been deactivated. In some embodiments, the control system is configured to activate the fluid module after the heat source has been deactivated.

DETAILED DESCRIPTION

Figure 1:
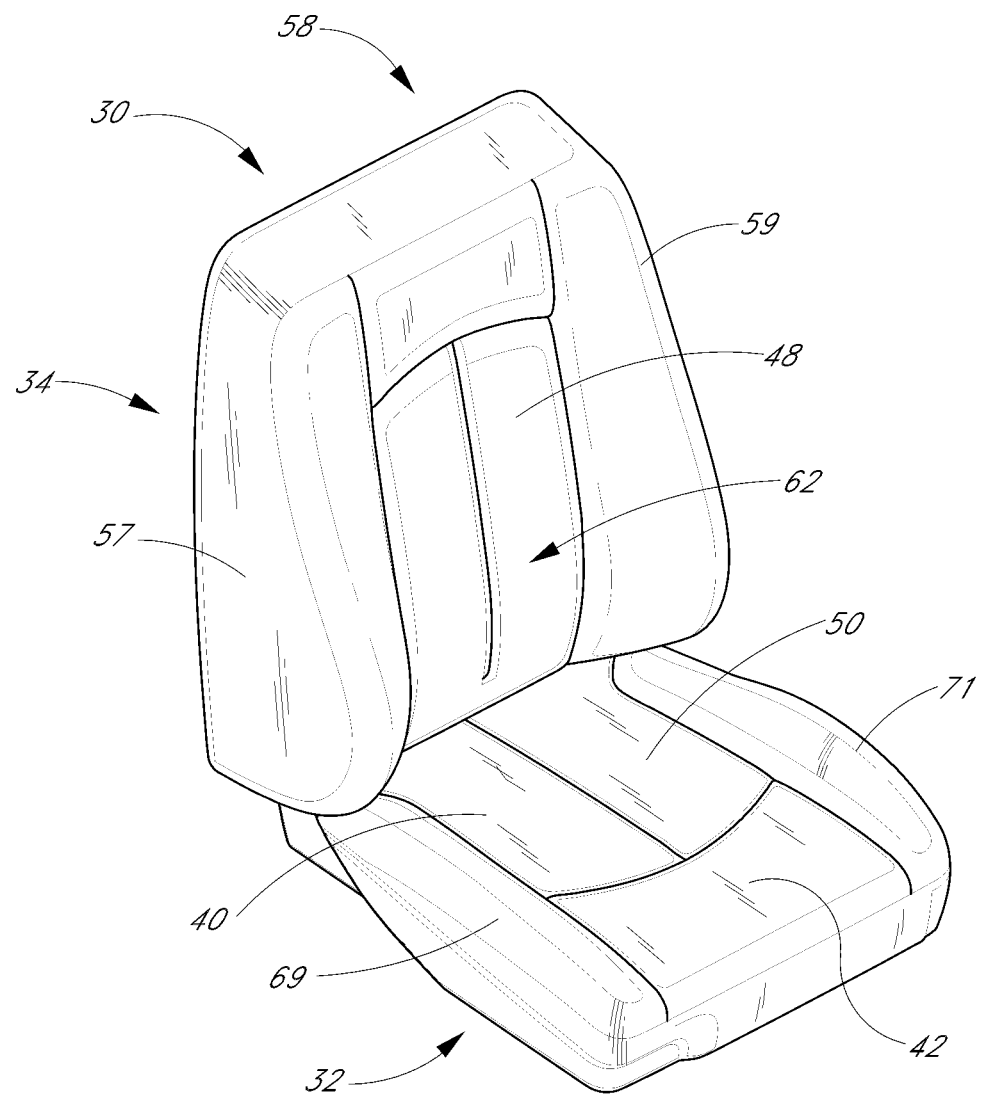
FIG. 1 is a perspective view of a vehicle seat assembly, which includes a climate control system that is configured in accordance with a preferred embodiment of the present invention.
Figure 2:
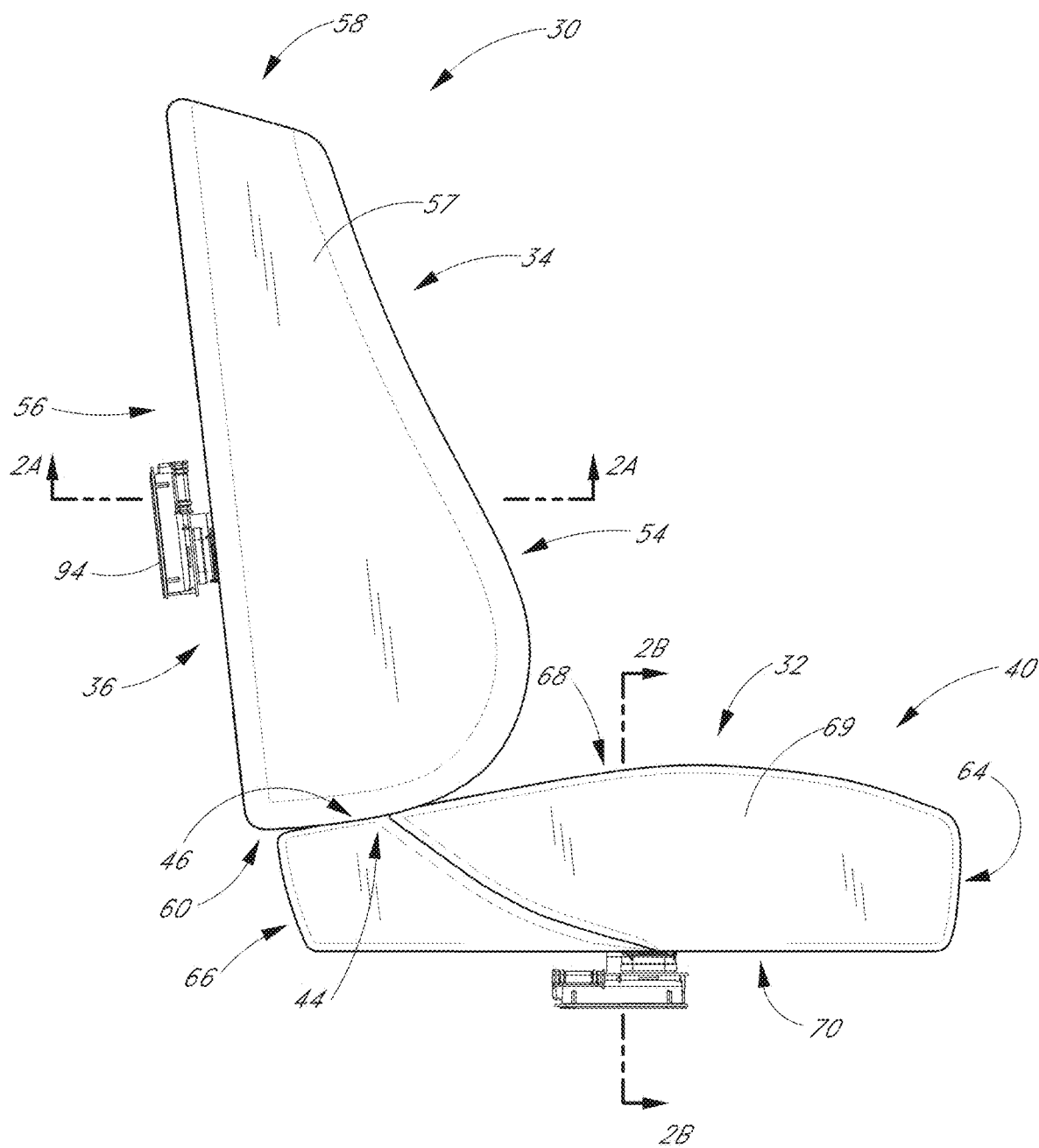
FIG. 2 is a side view of the vehicle seat assembly of FIG. 1.

FIGS. 1 and 2 illustrate an exemplary embodiment of a seat assembly 30 that comprises a seat portion 32 and a backrest portion 34. The seat assembly 30 includes a climate control system 36, which will be described in more detail below with reference to FIGS. 2A-4.

When an occupant sits in the seat assembly 30, the occupant's seat is located generally in a seat area 40 of the seat portion 32 and at least a portion of their legs are supported by a thigh area 42 of the seat portion 32. In this embodiment, a rear end 44 of the seat portion 32 is coupled to a bottom end 46 of the backrest portion 34. When the occupant sits in the seat assembly 30, the occupant's back contacts a front surface 48 of the backrest portion 34 and the occupant's seat and legs contact a top surface 50 of the seat portion 32. The surfaces 48, 50 cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the seat assembly 30 described herein may also be used in a variety of other applications and environments. For example, certain features and aspects of the seat assembly 30 may be adapted for use in other vehicles, such as, for example, an airplane, a boat, or the like. Further, certain features and aspects of the seat assembly 30 may also be adapted for use in stationary environments, such as, for example, a chair, a sofa, a theater seat, a mattress, and an office seat that is used in a place of business and/or residence. Other configurations of the seat assembly 30 are also anticipated, such as, for example, bench seating.

With continued reference to FIGS. 1 and 2, the backrest portion 34 has a front side 54, a rear side 56, a top side 58 and a bottom side 60. The backrest portion 34 includes a pair of sides 57, 59 extending between the top side 58 and bottom side 60 for providing lateral support to the occupant of the seat assembly 30. A lumbar region 62 of the backrest portion 34 is generally positioned between the sides 57, 59 of the backrest portion 34 near the seat portion 32.

In a similar manner, the seat portion 32 has a front side 64, a rear side 66, a top side 68 and a bottom side 70. The seat portion 32 also includes a pair of sides 69, 71, which extending from the rear side 66 and the front side 64 for providing lateral support to the occupant of the seat assembly 30. In one embodiment, the seat assembly 30 is secured to a vehicle by attaching the bottom side 70 of the seat portion 32 to the floor of a vehicle.

Figure 2A:
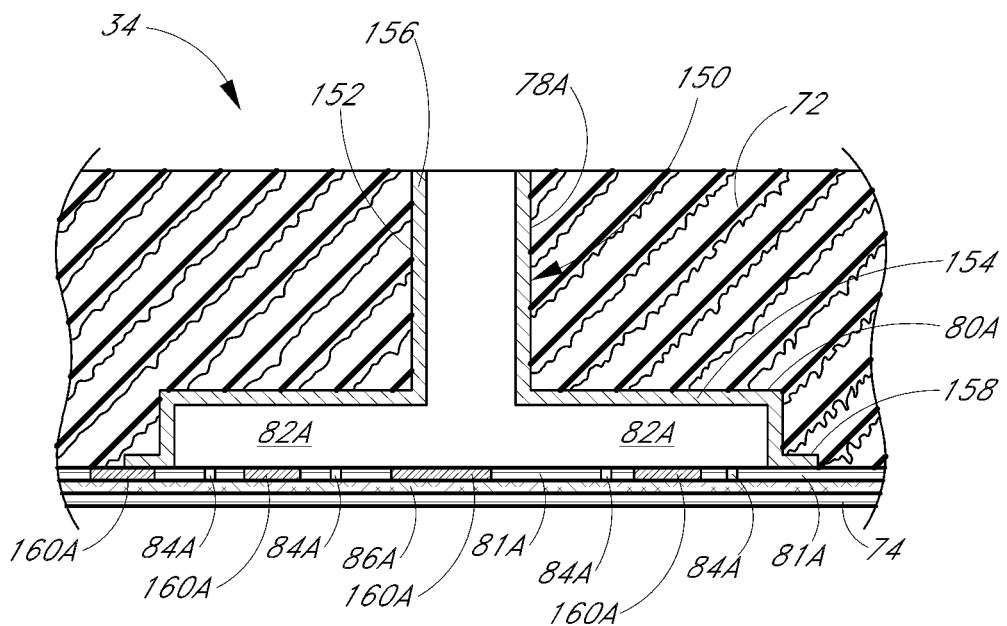
FIG. 2A is a cross-sectional view of the vehicle seat assembly of FIG. taken along line 2A-2A of FIG. 2.

FIG. 2A is a cross-sectional view of a portion of the backrest portion 34. As shown, the backrest portion 34 is generally formed by a cushion 72, which is covered with an appropriate covering material 74 (e.g., upholstery, leather or vinyl). The cushion 72 is usually supported on a metallic or plastic frame (not shown). In some embodiments, springs may be positioned between the frame and the cushion 72. The frame provides the seat assembly 30 with structural support while the cushion 72 provides a soft seating surface. The covering material 74 provides an aesthetic appearance and soft feel to the surface of the seat assembly 30. The seat portion 32 of FIG. 2B may be constructed in a similar manner as the backrest portion 34 as shown in FIG. 2A.

Figure 3:
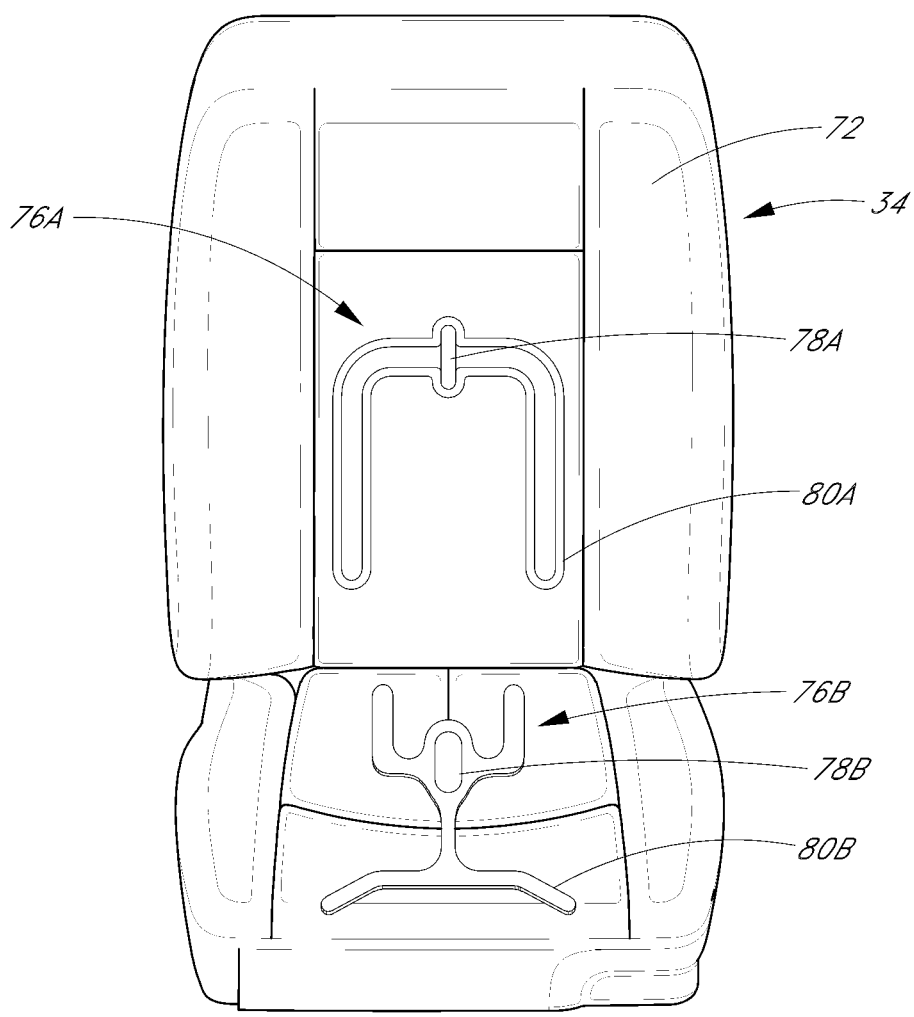
FIG. 3 is a front view of the vehicle seat assembly of FIG. 1 with a covering of the seat vehicle assembly removed.

FIG. 3 illustrates the seat assembly 30 with the covering 74 removed thereby exposing the cushion 72. The cushion 72 can be a typical automotive seat cushion foam or other types of materials with suitable characteristics for providing support to an occupant. Such materials include, but are not limited to, closed or open-celled foam.

Figure 3A:
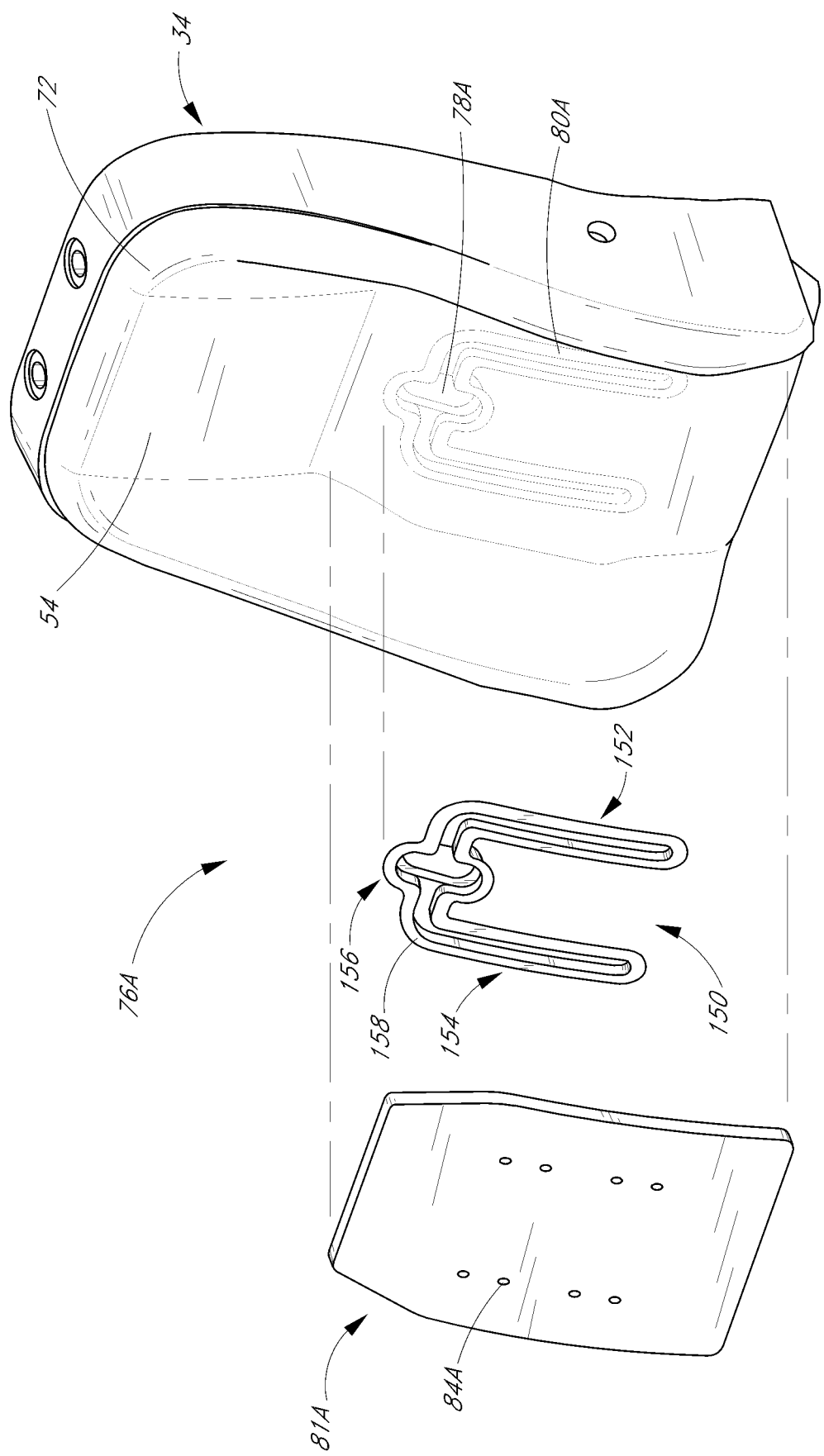
FIG. 3A is an exploded, side perspective view of a backrest of the vehicle seat assembly of FIG. 1.

As shown in FIGS. 3 and 3A, the backrest portion 34 of the seat assembly 30 is provided with a backrest fluid distribution system 76A. The distribution system 76A comprises an inlet passage 78A that extends through from the front side 54 to the rear side 56 of the seat cushion 72. (See also, e.g., FIG. 2A). The distribution system 76A also includes at least one, and often, a plurality of channels 80A, which extend from the inlet passage 78A. As mentioned above, the cushion 72 may be formed from a typical automotive cushion material, such as, for example, an open or closed-cell foam. In one embodiment, the cushion 72 is made of foam that is pre-molded to form the passage 78A and/or the channels 80A. In another embodiment, the passage 78A and/or the channels 80A may be formed by cutting foam out of the seat cushion 72.

With particular reference to FIG. 3A, in the illustrated embodiment, an insert or liner 150 may be positioned within the channels 80A, 80B for distributing the air. As shown, the insert 150 generally comprises a body 152, which includes a plurality of channels or plenums 154 with a generally U-shaped cross-section. The insert 150 is configured to fit generally with the channels 80A formed in the cushion 72. The plenums 154 extend from a duct 156 that extends through the inlet passage 78A. The periphery of the plenums 154 and duct 156 includes a flange 158 that extends generally parallel to the surface of the cushion 72. See FIG. 2A. The insert 150 is preferably formed of a moisture resistant, closed cell foam, which is configured to limit seepage of air into the cushion 72. However, in other embodiments, the insert 150 can be formed from other materials, such as, for example, molded plastic. Further details and additional embodiments of the insert 150 are provided in co-pending U.S. patent application Ser. No. 10/853,779, filed May 25, 2004, the entire contents of which are hereby incorporated by reference herein. As will be described below with reference to FIG. 2B, in a modified embodiment, the distribution system 76A may be formed without the insert 150.

With reference back to FIG. 2A, a cover or scrim 81A is positioned generally over the insert 150 to define distribution passages 82A for transporting air through the seat assembly 30. The scrim 81A includes one or more openings 84A for transporting air to and/or from the distribution passages 82A and preferably provides structural support to prevent or reduce the seat cover 74 from depressing into the passages 82A. The scrim 81A preferably includes one or more thermal elements 160A, which are preferably positioned within the scrim 81A generally adjacent the one or more openings 84A and are configured to effect a temperature change in the space adjacent the seat assembly 30. As will be explained in more detail below, in the illustrated embodiment, the thermal elements 160A are used to heat the air transported through the seat assembly and/or heat the portions of the seat assembly adjacent the thermal elements 160A.

The thermal elements 160A may comprise any of variety of devices for causing a temperature change, such as, for example, resistive heaters (e.g., resistive wires, carbon fiber based heating elements, and carbon impregnated sheets), chemical-reaction heaters, heat exchanges and/or Peltier thermoelectric devices. The thermal elements 160A may be used in combination with fabrics, foams etc. to form the scrim 81A. In another embodiment, the thermal elements 160A may be coupled to or positioned generally near the scrim 81A. In the illustrated embodiment, the scrim 81A is attached to the flange 158 in a manner that limits leakage between the scrim 81A and insert 150 thereby directing the flow of air through the openings 84A. In one embodiment, an adhesive is used to attach the scrim 81A to the insert 150. In other embodiments, a heat stake or fasteners may be used.

With continued reference to FIG. 2A, an optional distribution layer 86A is disposed between the scrim 81A and the seat covering 74. The distribution layer 86A spreads the air flowing through the openings 84A along the lower surface of the covering 74. To permit airflow between the distribution layer 86A and the spaces proximal to the front surface 48 of the backrest portion 34, the covering 74 may be formed from an air-permeable material. For example, in one embodiment, the covering 74 comprises an air-permeable fabric made of natural and/or synthetic fibers. In another embodiment, the covering 74 is formed from a leather, or leather-like material that is provided with small openings or apertures. In a modified embodiment, the distribution layer 86A may be omitted or combined with the seat covering 74 and/or the scrim 81A. As mentioned above, the scrim 81A is configured to allow for the passage of air. In the illustrated embodiment, this is accomplished by providing the scrim 81A with small openings or apertures. In another embodiment, the scrim 81A itself and/or the thermal elements 160A may be generally air-permeable With reference to FIGS. 2B and 3, the seat portion 32 of the seat assembly 30 is also provided with a seat distribution system 76B. The seat distribution system 76B comprises an inlet passage 78B that extends from the top side 68 to the bottom side 70 of the seat cushion 72. As with the backrest distribution system 76A, the seat distribution system 76B also includes at least one, and often, a plurality of channels 80B, which extend from the inlet passage 78B. These channels 80B may be configured as described above.

In the seat distribution system 76B, the portion of the cushion 72 that forms the channels 80B is preferably treated and/or covered with a coating, skin or other material configured such that air flowing through the channels 80B does not significantly seep into the cushion 72. In another embodiment, the cushion 72 may be formed from a dense foam that does not allow for significant seepage of air through the foam. In addition to or in the alternative, the seat distribution system 76B may include an insert or liner as described above with reference to FIGS. 2A and 3A.

The channels 80B are covered by a scrim or cover 81B to define distribution passages 82B for transporting air through the seat assembly 30. The scrim 81B is preferably configured as described above. Accordingly, the scrim 81B includes thermal elements 160B and one or more openings 84B for delivering air to and/or from the distribution passages 82B. As described above, the scrim 81B is preferably attached to the cushion 72 in a manner that limits leakage between the scrim 81B and cushion 72. A distribution layer 86B is optionally disposed between the scrim 81B and the seat covering 74. As mentioned above, in a modified embodiment, the distribution layer 86B can be omitted or combined with the seat covering 74 and/or the scrim 81 A. In addition, as with the covering 74, the scrim 81A itself may be configured such that it is generally air-permeable and/or provided with small openings or apertures 84B as shown in the illustrated embodiment.

As will be explained in more detail below, the thermal elements 160A, 160B are used to change the temperature (e.g., increase) in the space or portions of the seat adjacent the occupant of the seat assembly 30. The thermal elements 160A, 160B are preferably used in combination with fluid flow provided through the distribution system 76A, 76B. As explained below, when used in combination with fluid flow, the air may be conditioned or unconditioned before the thermal elements 160A, 160B changes its temperature. For example, in one embodiment, air (which can be heated) is delivered to the distribution passages 82A, 82B through the inlet passages 78A, 78B. The air then flows through the openings 84A, 84B and into the distribution layers 86A, 86B. The air is then directed through the covering 74 to a space adjacent to the front surface 48 of the backrest portion 34 and/or the top surface 50 of the seat portion 32. In another embodiment, the climate control system 36 is used to remove air, which is adjacent to the front surface 48 of the backrest portion 34 and/or the top surface 50 of the seat portion 32. In such an embodiment, the air is withdrawn through the covering 74 and into the distribution layers 86A, 86B. The air is then withdrawn through the openings 84A, 84B, into the distribution passages 82A, 82B and through the inlet passages 78A, 78B. In this manner, the air withdrawn and/or supplied through the distribution systems 76A, 76B may be used to supplement and/or enhance the thermal elements 160A, 160B. In one embodiment, thermal elements 160A, 160B provide heat to the occupant via conduction through the covering 74 and other layers of material. In such an embodiment, the fluid flow can enhance the thermal elements 160A, 160B by also transferring the heat generated by the thermal elements 160A, 160B to the occupant via convection.

Given the goal of distributing air through the cushion 72 and along the covering 74, those of skill in the art will recognize that the distribution systems 76A, 76B for the backrest portion 34 and the seat portion 32 may be modified in several different manners. For example, the shape and/or number of channels 80A, 80B and/or openings 84A, 84B may be modified. In other embodiments, the scrim 81A, 81B and/or distribution passages 82A, 82B may be combined and/or replaced with other components configured for similar functions. In other embodiments, the distribution systems 76A, 76B or portions thereof may be combined with each other. In addition, various features of the distribution systems 76A, 76B of the backrest portion 34 and seat portion 32 may be combined and/or interchanged with each other.

Figure 4:
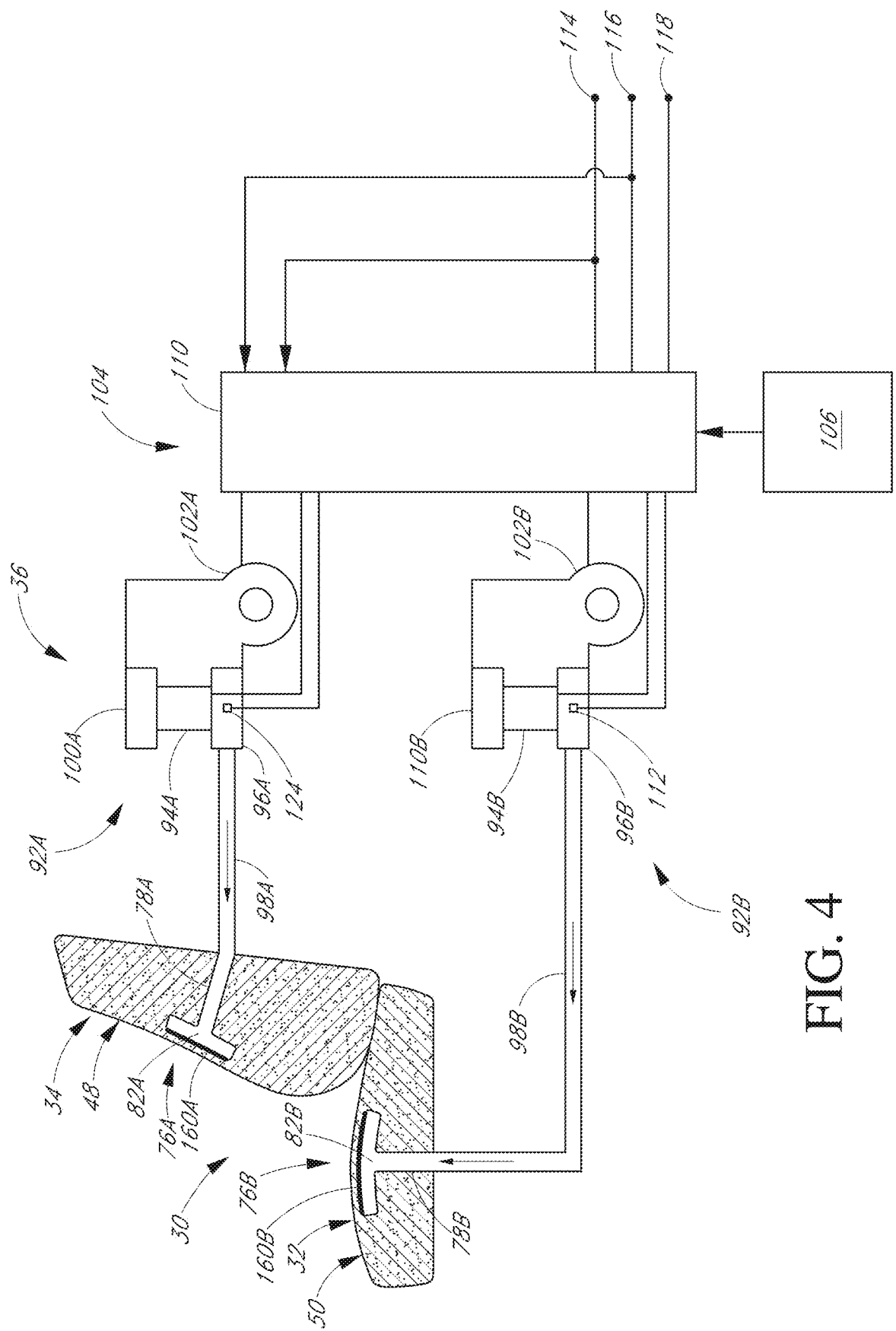
FIG. 4 is a schematic illustration of the vehicle seat assembly and climate control system of FIG. 1.

FIG. 4 is a schematic illustration of the temperature control system 36. In the illustrated embodiment, the temperature control system 36 includes the thermal elements 160A, 160B and the distribution systems 76A, 76B described above. The system 36 also includes a back fluid module 92A and seat fluid module 92B. As will be explained below, both fluid modules 92A, 92B are configured to provide and/or remove fluid from the distribution systems 76A, 76B described above and/or provide conditioned air (e.g., heated air) to the distribution systems 76A, 76B. In this manner, the fluid modules 92A, 92B provide a fluid flow to/from the seat assembly 30, which can be used to enhance or supplement the heat provided by the thermal elements 160A, 160B described above.

In the illustrated embodiment, the fluid modules 92A, 92B preferably each include a thermoelectric device 94A, 94B for conditioning (e.g., selectively heating or cooling) the fluid flowing through the device 94A, 94B. A preferred thermoelectric device 94A, 94B is a Peltier thermoelectric module, which is well known in the art. The illustrated fluid modules 92A, 92B preferably also include a main heat exchanger 96A, 96B for transferring or removing thermal energy from the fluid flowing through the modules 92A, 92B and to the distribution systems 76A, 76B. Such fluid is transferred to the distribution systems 76A, 76B through conduits 98A, 98B (see e.g., U.S. application Ser. No. 10/973,947, filed Oct. 25, 2004, which is hereby incorporated by reference herein). In the illustrated embodiments, the modules 92A, 92B also preferably include a waste heat exchanger 100A, 100B (see FIG. 4) that extends from the thermoelectric device 94A, 94B generally opposite the main heat exchanger 96A, 96B. A pumping device 102A, 102B is preferably associated with each fluid module 92A, 92B for directing fluid over the main and/or waste heat exchangers 96A, 96B, 100A, 100B. The pumping devices 102A, 102B may comprise an electrical fan or blower, such as, for example, an axial blower and/or radial fan. In the illustrated embodiment, a single pumping device 102A, 102B may be used for both the main and waste heat exchanges 96A, 96B, 100A, 100B. However, it is anticipated that separate pumping devices may be associated with the waste and heat exchanges 96A, 96B, 100A, 100B.

It should be appreciated that the fluid modules 92A, 92B described above represents only one exemplary embodiment of a device that may be used to move and/or condition the air supplied to the distribution systems 76A, 76B. Any of a variety of differently configured fluid modules may be used to move and/or provide conditioned air. Other examples of fluid modules that may be used are described in U.S. Pat. Nos. 6,223,539, 6,119,463, 5,524,439 or 5,626,021, which are hereby incorporated by reference in their entirety. Another example of such a fluid module is currently sold under the trademark Micro-Thermal Module™ by Gentherm Incorporated (formerly Amerigon, Inc.). In another example, the fluid module may comprise a pump device without a thermoelectric device and/or waste heat exchanger for thermally conditioning the air. In such an embodiment, the pumping device may be used to remove or supply air to the distribution system 76A, 76B. In yet another embodiment, the fluid modules 92A, 92B, may share one or more components (e.g., pumping devices, thermoelectric devices, etc.) with each other and/or with the vehicles general climate control system. In another embodiment, a single fluid module is used to supply air to both distribution systems 76A, 76B.

In operation, fluid in the form of air can be delivered from the fluid modules 92A, 92B, through the conduits 98A, 98B to the corresponding distribution systems 76A, 76B. As described above, the air flows through the passages 82A, 82B, into the openings 84A, 84B and then along the distribution layers 86A, 86B and through the coverings 74. In this manner, conditioned or unconditioned air can be provided to the front surface 48 of the backrest portion 34 and/or the top surface 50 of the seat assembly. As mentioned above, the air supplied to the seat assembly may enhance or supplement the thermal elements 160A, 160B.

In a modified embodiment, air from within the passenger compartment of the automobile can be drawn through the covering 74, into the distribution layers 86A, 86B and through the openings 84A, 84B. The air then can flow through the distribution passages 82A, 82B, into the inlet passages 78A, 78B and then into the conduit 98A, 98B. In this manner, the temperature control system 36 can provide suction so that air near the surface of the seat assembly 30 is removed. As mentioned above, the air removed from the seat assembly 30 may enhance or supplement the thermal elements 160A, 160B.

An exemplary control system 104 for the temperature control system 36 will now be described with continued reference to FIG. 4. As shown, the control system 104 includes a user input device 106 through which the user of the climate control system 36 can provide a control setting or set mode for the climate control system 36. The control setting can comprise a specific temperature setting (e.g., 65 degrees), a more general temperature setting (e.g., "hot" or "cold"), and/or a setting for the pumping device (e.g., "high," "medium," or "low"). In some embodiments, the pumping device can also be set to an optimized level based on the temperature setting, rather than three set points. Depending upon the desired configuration, the input device 106 may include any of a variety of input devices, such as, for example, dials, buttons, levers, switches, serial communication from another device, etc. The user input device 106 may also include a user output that provides visual or audio indicia of the control setting (e.g., an LED display).

With continued reference to FIG. 4, the input device 106 is operatively connected to a control module 110. The control module 110 is, in turn, operatively connected to the pumping devices 102A, 102B and the thermoelectric devices 94A, 94B of the fluid modules 92A, 92B for the backrest portion 34 and seat portion 32. The control unit 110 is also operatively connected through control lines (not shown) to the thermal elements 160A, 160B. Temperature sensors 112, 124 are provided to measure the temperature of the thermoelectric devices (e.g., a component thereof), of fluid conditioned by the thermoelectric devices 94A, 94B and/or the like. The temperature sensors 112, 124 are also operatively connected to the seat control module 110. Temperature sensors (not shown), which are preferably located near or proximate to the thermal elements 160A, 160B may also be operatively connected to the control module 110.

In the illustrated embodiment, the control module 110 is operatively connected to a power source 114 and a ground source 116 and includes an appropriate power control unit to provide sufficient electrical capacity to operate one, a plurality or all of the aforementioned devices (92A, 92B, 112, 124, 160A, 160B). In some embodiments, the seat control module 110 also has a controller that is configured to receive the occupant inputs from the input device 106 and the temperature information from the temperature sensors 112, 124. From this information, the seat control module 110 is configured to adjust the operation of the thermal elements 160A, 160B, the thermoelectric devices 94A, 94B and/or the fluid pumps 102A, 102B according to a predetermined logic designed to ensure occupant comfort and to protect against system damage.

Those of skill in the art will appreciate that the seat control module 110 can comprise a hard-wired feedback control circuit, a dedicated processor or any other control device that can be constructed for performing the steps and functions described herein. In addition, the controller within the control module 110 may be combined or divided into subcomponents as deemed appropriate. For example, it may be advantageous to divide the control module into a first module for conditioning the backrest portion 34 and a second control module for conditioning the seat portion 32. See e.g., U.S. patent application Ser. No. 10/047,077, filed Jan. 31, 2005, which is hereby incorporated by reference herein. In another embodiment, separate control modules may be provided for the thermal elements 160A, 160B and the fluid modules 92A, 92B. In addition, it should be appreciated that the control system 104 represents only one exemplary arrangement of a system for controlling the operation of the climate control system 36. Those of skill in the art will recognize in light of the disclosure herein various other configurations for the control system 104. In addition, one or more components of the control module 110 may be located in various locations, such as, within one or both of the fluid modules 92A, 92B or in a separate location.

Various components are described as being "operatively connected" to the control unit. It should be appreciated that this is a broad term that includes physical connections (e.g., electrical wires or hard wire circuits) and non-physical connections (e.g., radio or infrared signals). It should also be appreciated that "operatively connected" includes direct connections and indirect connections (e.g., through additional intermediate device(s)).

The control module 110 optionally may also be configured to receive a signal from a vehicle control device 118 that indicates whether the vehicle's ignition has been turned on. In this manner, the seat control module 110 may be configured to allow operation of the system 36 only if the vehicle's engine is running.

The control module 110 may include various electronic and/or computing components. The term "control module" as used herein can refer to, be a part of, or comprise a processor that executes code, an Application Specific Integrated Circuit (ASIC), an electronic circuit, a combinational logic circuit, a field programmable gate array (FPGA), a hard-wired feedback control circuit, other suitable components that provide the described functionality, or a combination of some or all of the foregoing. The control unit can further comprise memory (shared, dedicated, or group) that stores code executed by the control unit. Thus, in some embodiments, the control module 110 may include a microprocessor, memory storage and programs to execute control logic. The first control module 6 may receive input from a number of sensors and may adjust various operating parameters of the system based on such input. Any suitable control algorithms may be implemented. The control module 110 may be coupled with various sensors and/or devices, such as with thermal sensors or a miniature compressor, heat transfer device, etc. to adjust the thermal output to certain components. In some embodiments, the control module 110 may be near or part of an electronic control unit or module of the vehicle for controlling various operations of the vehicle over, for example, a controller area network (CAN) bus of the vehicle. Further details of the various sensors and devices that may be coupled with the control module 110 are discussed herein.

In one embodiment, the thermal elements 160A, 160B are activated to heat the surfaces 48, 50 of the backrest portion 34 and seat portion 32. While the thermal elements 160A, 160B are activated, the fluid modules 92A, 92B can provide a fluid flow to the surfaces 48, 50 of the backrest portion 34 and seat portion 32. The fluid may be unconditioned (e.g., not heated) and in such an embodiment the fluid can enhance the thermal elements 160A, 160B by promoting convection of heat from the thermal elements to the surfaces 48, 50 of the backrest portion 34 and seat portion 32. In another embodiment, while the thermoelectric devices 94A, 94B are activated, the fluid modules 92A, 92B provide heated air to the surfaces 48, 50 of the backrest portion 34 and seat portion 32. In this manner, the fluid modules 92A, 92B supplement and enhance the heating effect provided by the thermal elements 160A, 160B. In yet another embodiment, the thermal elements 160A, 160B are used during a first or initial period of time to heat the surfaces 48, 50 of the backrest portion 34 and seat portion 32 largely through conduction. After the first or initial period of time, the fluid modules 92A, 92B can provide conditioned or un-conditioned air to the surfaces 48, 50 of the backrest portion 34 and seat portion 32.

The above described embodiments have several advantages. For example, in particularly cold conditions, it may take a long period of time to heat noticeably the seat assembly using heated air provided by the fluid modules alone. In the above described embodiment, because the thermal elements 160A, 160B are positioned near the surfaces 48, 50 of the backrest portion 34 and seat portion 32, they can provide immediate heat via conduction that can be sensed by the occupant of the seat assembly 30. The air provided through the distribution system 76A, 76B can enhance (e.g., through convection) or supplement (e.g., by providing conditioned air) the heat provided by the thermal elements 160A, 160B.

Accordingly, in one embodiment the control module 110 can be configured to use both the thermal elements 160A, 160B and heated air provided by the fluid modules 92A, 92B during particularly cold conditions (e.g., as determined by an appropriately positioned sensor). In addition to or in an alternative embodiment, the control module 110 can be configured to use both the thermal elements 160A, 160B and heated air provided by the fluid modules 92A, 92B when the user selects an elevated (e.g., high or maximum) setting. In a lower setting (e.g., low and/or medium), only the thermal elements 160A, 160B or the fluid modules 92A, 92B can be used to heat the seat assembly 30.

In addition, some climate control systems are relatively expensive and thus may not be suitable for all applications. In particular, the thermoelectric elements 94A, 94B may be too expensive for some applications. In such applications, the fluid modules 92A, 92B may be formed without the thermoelectric elements 94A, 94B and may be used to simply provide air to and/or remove air from the seat surface through the distribution system 76A, 76B. In this manner, a low cost climate control system is formed. In such a system, the thermal elements 160A, 160B are used to selectively control (e.g., heat) the surfaces of the seat assembly 30. The fluid flow provided by the fluid modules 92A, 92B can used to enhance the transfer of heat to the occupant and/or the thermal elements 160A, 160B can be operated alone. When cooling is desired, the fluid modules 92A, 92B can provide air flow to the seat assembly or withdraw air from the seat surface to provide a cooling effect.

In a modified embodiment, the fluid module 92A, 92B can include a thermoelectric element that is configured to provide only and/or primarily cooled air to the seat surface through the distribution system 76A, 76B. The control module 110 can be configured such that when the user desires cooling, the fluid module 92A, 92B provides cooled air to the seat surface. When the user desires heating, the thermal elements 160A, 160B can be used to heat selectively the surfaces of the seat assembly 30. During heating, the fluid modules 92A, 92B can provide fluid to enhance the transfer of heat to the occupant and/or the thermal elements 160A, 160B can be operated alone. In this embodiment, the control module 110 and fluid modules 92A, 92B can be simplified because the thermoelectric element devices do not have to be configured to provide both cooling and heating functions.

While various embodiments and modes of operation have been described above, it is anticipated that the different portions of the seat assembly 30 (e.g., seat and backrest portions) may be controlled in modified manners and/or controlled to different temperature settings.

Figure 2B:
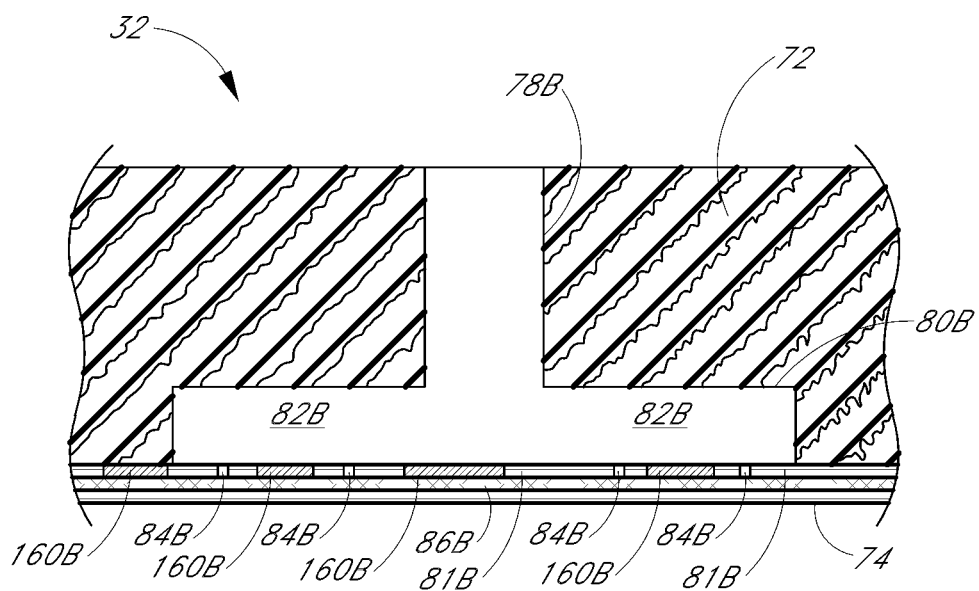
FIG. 2B is a cross-sectional view of the vehicle seat assembly of FIG. taken along line 2B-2B of FIG. 2.
Figure 5A:
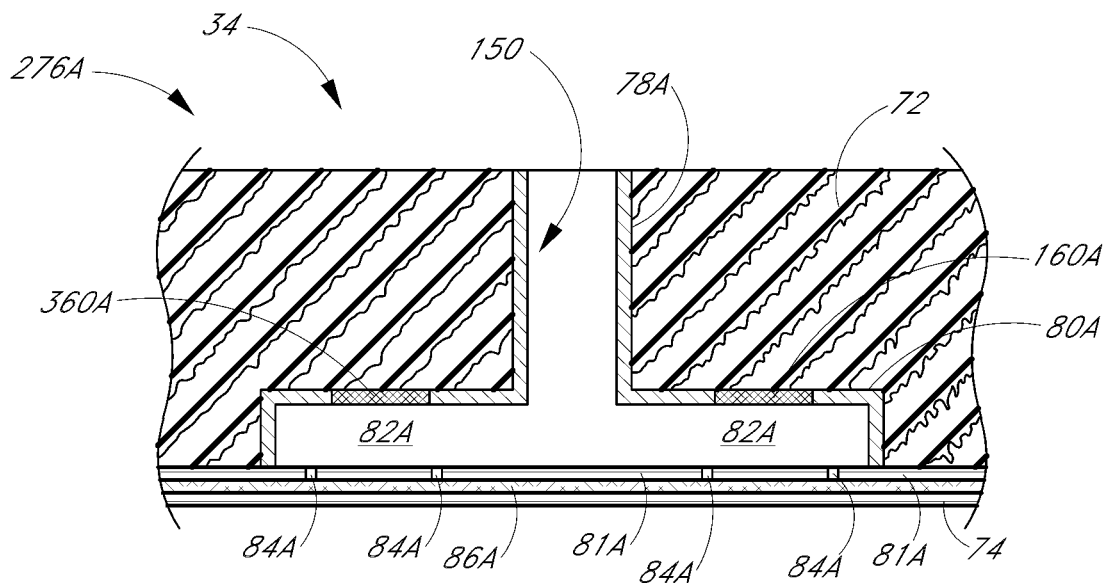
FIG. 5A is a cross-sectional view of a backrest of a modified embodiment of a vehicle seat assembly.
Figure 5B:
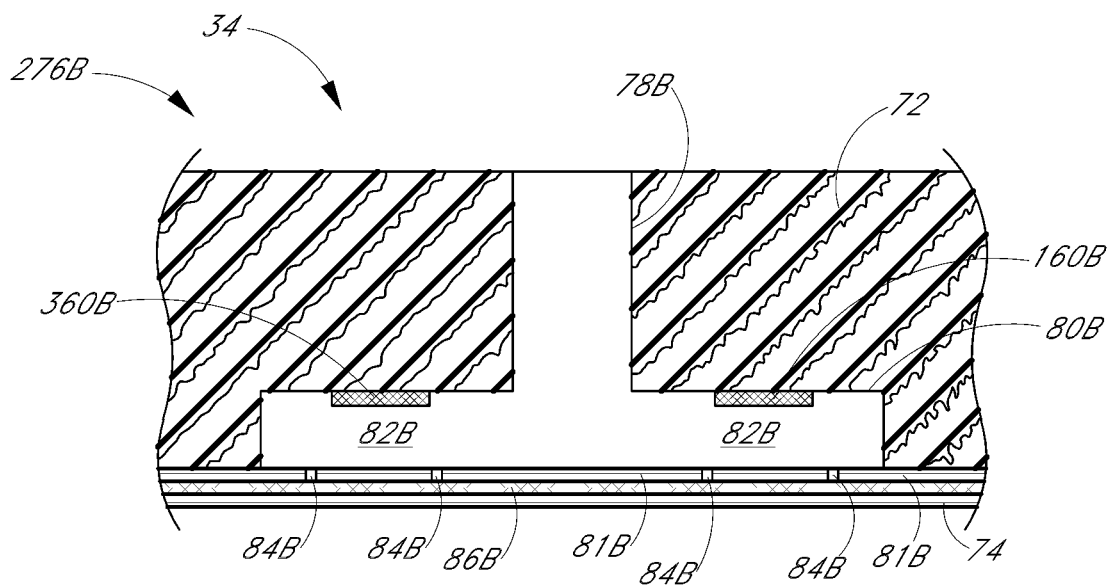
FIG. 5B is a cross-sectional view of a seat of a modified embodiment of a vehicle seat assembly.

FIGS. 5A and 5B illustrate portions of a distribution system 276A, 276A of a modified embodiment of a climate control system. In FIGS. 5A and 5B, like elements to those shown in FIGS. 2A and 2B are designated with the same reference numbers used in FIGS. 2A and 2B. In addition, only certain components of the climate control system will be described in detail below. For those components not described in detail, reference may be made to the detailed description above.

As with the embodiments described above, the climate control system generally comprises thermal elements 360A, 360B, fluid modules (not shown) and the distribution systems 276A, 276B. In this embodiment, the heating elements 360A, 360B are positioned generally within or proximate to the distribution passages 82A, 82B and/or the inlet passages 78A, 78B which are used to transport air through the seat assembly 30. In this manner, the heating elements 360A, 360B may be used to heat the air delivered to the surfaces 48, 50 of the seat assembly 30.

With respect to the illustrated embodiment, the thermal element 160A for the backrest portion 34 may form at least in part a portion of the insert 150, which forms the distribution passage 82A. The air flowing through the distribution passage is heated by the thermal element 360A and then delivered to the occupant through the openings 84A. In a modified embodiment, the thermal element 360A may be positioned along the inner or outer surface of the insert 150.

With respect to FIG. 5B and the seat portion 32, the thermal elements 360B may line and/or form part of the channels 80B in the seat cushion 72. As with the backrest 34, the thermal elements 360B heat the air flowing through the passages 82B. In other embodiments, the thermal elements 360B may be positioned within the cushion 72.

Accordingly, with the thermal elements 360A, 360B generally positioned within the seat cushion 72 between the seat cover 74 and the backside 56 or under side 70 of the seat assembly 30, the thermal elements 360A, 360B can heat the air delivered by the fluid module to the seat assembly 30. It should be appreciated that in a modified embodiment one or more thermal elements (not shown) can be provided near or adjacent the front or top surface of the seat. In such an embodiment, the thermal elements can be provided within the scrim 81A, 81B as described above with reference to FIGS. 2A and 2B.

Figure 6A:
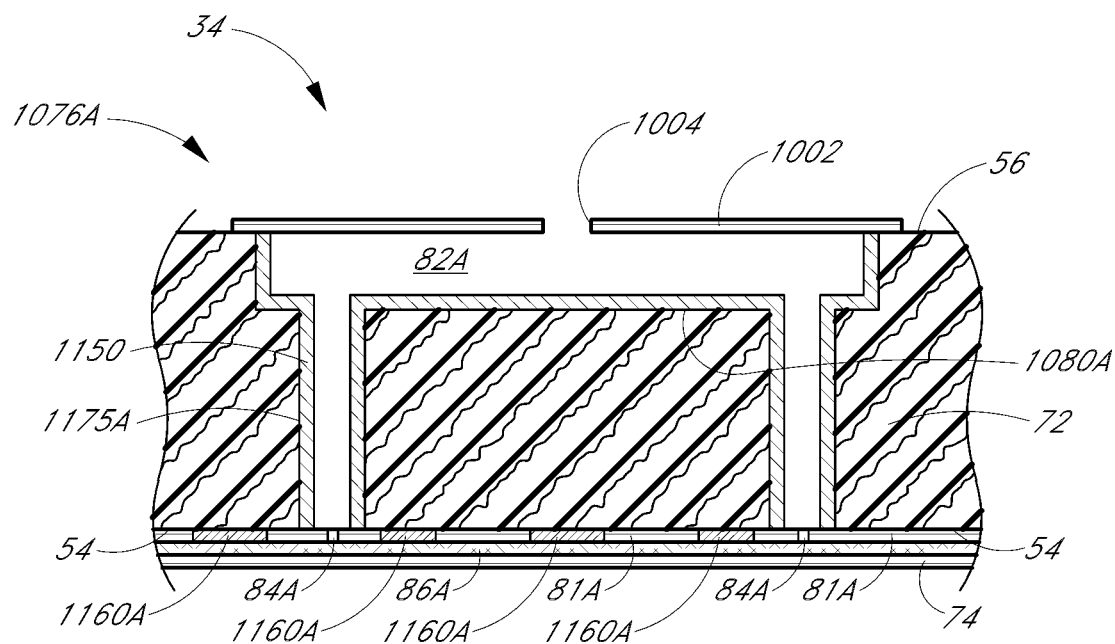
FIG. 6A is a cross-sectional view of a backrest of another modified embodiment of a vehicle seat assembly.
Figure 6B:
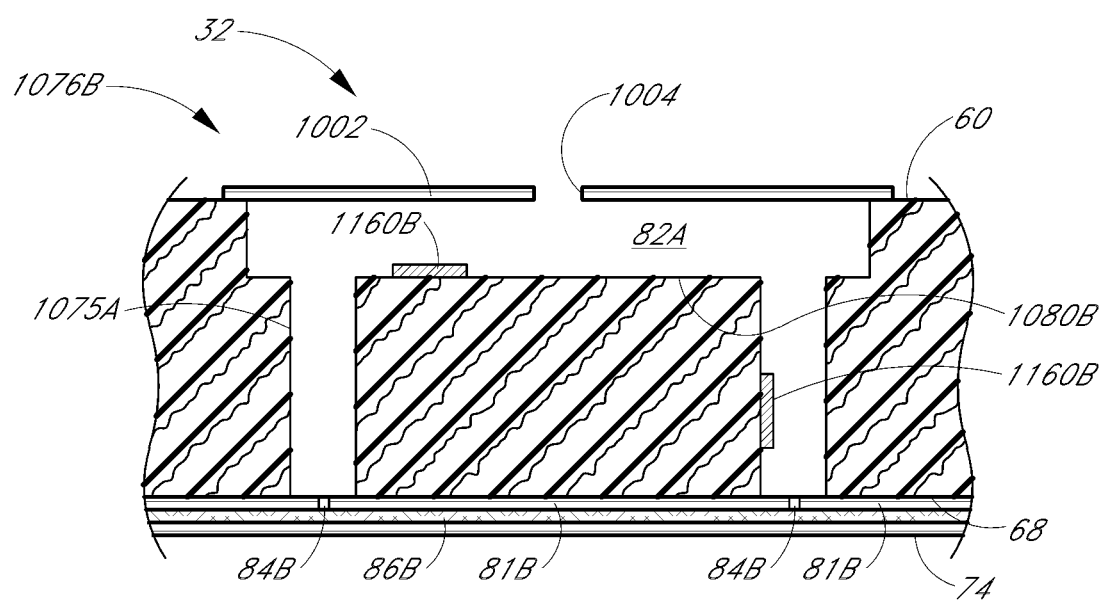
FIG. 6B is a cross-sectional view of a seat of an additional modified embodiment of a vehicle seat assembly.

FIGS. 6A and 6B illustrate portions of a distribution system 1076A, 1076B other modified embodiments of a climate control system. In FIGS. 6A and 6B, like elements to those shown in FIGS. 2A and 2B are designated with the same reference numbers used in FIGS. 2A and 2B. In addition, only certain components of the climate control system will be described in detail below. For those components not described in detail, reference may be made to the detailed description above.

As with the embodiments described above, the climate control system generally comprises thermal elements 1160A, 1160B, fluid modules (not shown) and the distribution systems 1076A, 1076B. With reference to FIG. 6A, in this embodiment, the distribution system 1076A for the backrest portion 34 includes at least one and preferably a plurality of channels 1080A, which are positioned generally on the rear side 56 of the seat cushion 72. At least one and preferably a plurality of through passages 1175A extend from the channels 1080A to the front side 54 of the cushion 72. The passages 1175A are covered by a cover or scrim 81A, distribution layer 86A and covering 74, which can be arranged and/or combined as described above with reference to FIGS. 2A and 2B. In the illustrated embodiment, the thermal elements 1160A are positioned within the scrim 81A near the openings 84A. An insert 1150 as described above may be provided within the channels 1080A and/or the passages 1175A. A rear covering 1002 with an inlet 1004 is provided for defining distribution passages 82A and connecting the distribution passages 82A to a fluid module. In addition, it should be appreciated that in a modified embodiment one or more thermal elements (not shown) can be provided within or near the channels 1080A or passages 1175A as described below with reference to FIG. 6B.

FIG. 6B illustrates the distribution system 1076B for the seat portion 32. As with the backrest portion 34 shown in FIG. 6A, the distribution system 1076B includes a least one and preferably a plurality of channels 1080B, which are positioned generally on the bottom side 60 of the seat cushion 72. At least one and preferably, a plurality of through passages 1075A extend through from the channels 1080B to the top side 54 of the cushion 72. The passages 1075A are covered by a cover or scrim 81B, distribution layer 86B and covering 74, which can be arranged and/or combined as described above with reference to FIGS. 2A and 2B. A bottom covering 1002 with an inlet 1004 is provided for defining distribution passages 82B and connecting the distribution passages 82B to a fluid module.

In this embodiment, the heating elements 1160B are positioned generally within or proximate to the distribution passages 82B as formed by the channels 1080B and/or through passages 1075B, which are used to transport air through the seat assembly 30. In addition, the distribution system 1076B of this embodiment does not include an insert. However, as mentioned above, it should be appreciated that certain components and features of the distribution systems 1076A, 1076B for the seat and cushion portions 32, 34 may be exchanged and/or combined. For example, the seat portion 32 may include an insert and/or the thermal elements can positioned within the scrim. In addition, it should be appreciated that in a modified embodiment one or more thermal elements (not shown) can be provided near or adjacent the top surface of the seat.

In such an embodiment, the thermal elements can be provided within the scrim 81B as described above with reference to FIG. 2B.

Figure 7:
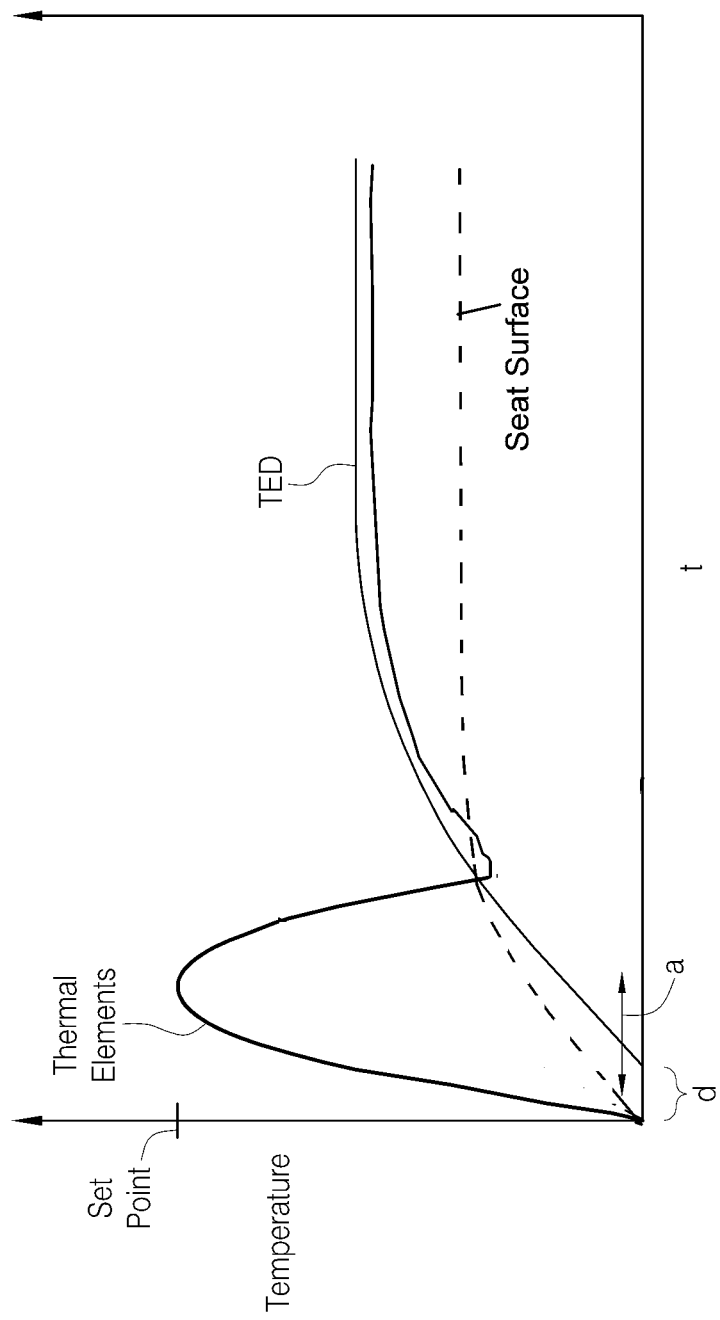
FIG. 7 is a graphical illustration of the power supplied to a heating element and a fluid module of an embodiment of a climate control system.

As mentioned above, in one embodiment, the thermal elements 160A, 160B can be used during a first or initial period of time to heat the surfaces 48, 50 of the backrest portion 34 and seat portion 32 largely through conduction. After the first or initial period of time, the fluid modules 92A, 92B can be used to provide conditioned or un-conditioned air to the surfaces 48, 50 of the backrest portion 34 and seat portion 32. FIG. 7 is a graphical illustration of one embodiment of a control routine, which can be used in such an embodiment.

As shown in FIG. 7, the user can provide the control unit 110 with a set temperature. For example, the user can choose between high, medium and low settings, which each correspond to a set temperature. In another embodiment, the user can select the temperature (e.g., 100 degrees) on a dial or other input device. The controller 110 is configured such that during an initial time period d, power is supplied to the thermal elements 160A, 160B while the fluid modules 92A, 92B remain off. In a preferred embodiment, control delay is not controlled directly. The time period d is preferably determined by a period required for the thermal elements to reach a predetermined temperature. In a modified embodiment, during this initial time period d, unconditioned fluid can be provided to the seat by the fluid transfer device 102A, 102B to enhance the heating by the thermal elements 160A, 160B. When the thermal elements reach a prescribed temperature setpoint, the controller 110 can activate the thermal electric unit 94A, 94B and the fluid transfer device 102A, 102B (if not already activated). In some embodiments, the thermal elements may be deactivated when a temperature threshold is reached. In the illustrated embodiment, there is a transition period in which the power supplied to the fluid modules 92A, 92B is increased and the power supplied to the thermal elements 160A, 160B is decreased. During this period, it can be advantageous to keep the total power supplied to the thermal elements 160A, 160B and the fluid modules 92A, 92B substantially constant. After a certain period of time, the power supplied to the thermal elements 160A, 160B is terminated while the fluid modules 92A, 92B are used to heat the seat assembly 30.

As shown by the arrow a in FIG. 7, the controller 110 can be configured to start the climate control system 36 when the thermal elements 160A, 160B are activated or after an initial time period d. The time period d is determined by the period required for the thermal elements to reach a predetermined temperature corresponding to a predetermined seat surface temperature. In one embodiment, the time period d is greater than 60 seconds and, in another embodiment, the time period d is greater than 120 seconds. In certain embodiments, the fluid modules 92A, 92B are activated after the thermal elements 160A, 160B are turned off. In other embodiments, the fluid modules 92A, 92B are activated while the thermal elements 160A, 160B are still being supplied power (e.g. as illustrated in FIG. 7). The thermal elements and thermoelectric device are operated at higher temperatures than the temperature at the seat surface due to thermal resistance between the surface and the thermal elements as well as heat losses.

As mentioned above, because the thermal elements 160A, 160B are positioned near the surfaces 48, 50 of the backrest portion 34 and seat portion 32; they can provide immediate heat via conduction that can be sensed by the occupant of the seat assembly 30. This can be particularly advantageous in cold conditions where it may take a long period of time to heat noticeably the seat assembly using heated air provided by the fluid modules alone. After a period of time the fluid modules 92A, 92B provide a sufficient amount of heated air to the user that the power supplied to the thermal elements 160A, 160B can be turned off or significantly reduced. The transition from using the thermal elements 160A, 160B to using the fluid modules 92A, 92B to provide heating is preferably configured such that the user does not notice the transition.

Additional Control Concepts

According to some embodiments, a climate control system for a seat (e.g., a vehicle seat, an office chair, a sofa, etc.) includes a thermal element and a fluid conditioning module (or fluid module) for each of the seat bottom or cushion and the seat back. Each thermal element can be located within a respective cushion or other support structure adjacent a seat surface to be conditioned and selectively provides heat to the surface by conductive heating. In one example, the thermal elements include resistive heater mats or other conductive heating devices. Each of the fluid conditioning modules or fluid modules can include a conditioning device (e.g., thermoelectric device or TED, other convective heating and/or cooling device, etc.) that selectively conditions air (e.g., heats and/or cools) and a fluid supply device (e.g., blower, fan, other fluid transfer device, etc.) that provides the conditioned air to the surface through an air distribution system provided in the seat. The terms fluid conditioning module and fluid module are used interchangeably herein.

The climate control system can further include one or more temperature sensors and one or more control modules. In some embodiments, one or more temperature sensors are associated with each of the thermal elements and fluid conditioning modules. The temperature sensors can measure a temperature of a thermal element (e.g., resistive heater mat or other heating device), a fluid module (e.g., the TED or a component thereof, e.g., a substrate, semiconductor elements, heat exchange members, etc., passageway or other interior or exterior portion of a fluid module housing, etc.), the ambient air entering a fluid module, the air discharged by a fluid module, a portion of the seat (e.g., cushion or other component), a temperature within the setting in which the seat is positioned (e.g., the interior of an automobile or other vehicle, a room, etc.) and/or the like. The temperature sensors output signal indicative of the measured temperatures and, therefore, the heat provided or transferred by one or more components of the climate control systems. In some embodiments, the control module(s) independently controls operation of the thermal elements and/or the fluid conditioning modules such that the surfaces of the seat cushion and the seat back are maintained at different temperatures or settings, as set by an occupant of the seat (e.g., set point temperatures or temperature ranges, general setting such as low/medium/high, etc.).

In some embodiments, the control module periodically executes separate control routines, which can be stored in a memory, for each of the thermal elements and fluid conditioning modules. In one example, the control loop is a fixed time period and the routines are substantially similar, except as noted herein. The control routines for each device can include a mode control subroutine, a heating mode subroutine and a cooling mode subroutine. The control module can further include a watchdog power shedding control routine. Various features of the control routines are illustrated in the embodiments depicted in FIGS. 8-14.

Figure 8:
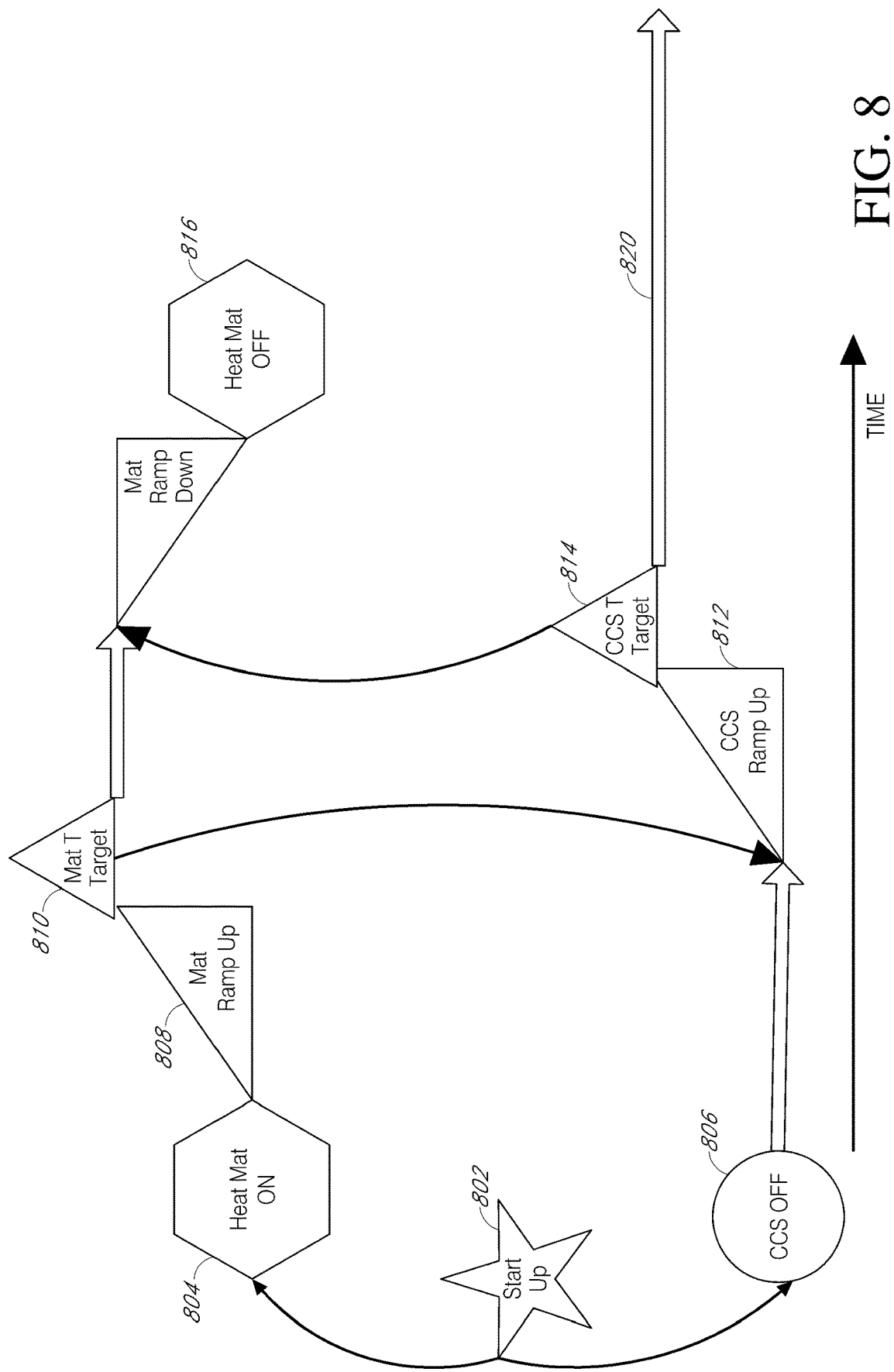
FIG. 8 is a schematic illustration of a control subroutine for a climate control system, according to one embodiment.

One embodiment of a start up subroutine is illustrated in FIG. 8. As depicted, in some embodiments, at start up 802, the control subroutine initially directs operation of the thermal element 804. In some embodiments, as the thermal element 804 is activated, the temperature of the thermal element ramps up 808 toward a thermal element target temperature 810. At this target temperature 810, the fluid module 806, which has been off, can be activated. As the fluid module is activated and begins to operate, the temperature of the fluid module can increase 812 (e.g., toward a fluid module target temperature 814). In some embodiments, at this time, the thermal element 804 can be instructed to turn off (or to operate at a lower level) 816. In some embodiments, the fluid module 806 continues to operate to maintain the temperature at the desired set point temperature 820. In some embodiments, it can be advantageous to initially operate the thermal element 804, as the thermal element 804 can raise the temperature more quickly than the fluid module 806. However, operating both the thermal element 804 and the fluid module 806 at the same time can result in high power consumption. Accordingly, in some embodiments, a control routine is utilized to attain a target temperature (e.g., by operating both the thermal element 804 and the fluid module 806 at the same time, either continuously or intermittently), while maintaining overall power consumption of the climate control system at or below a particular threshold level.

Figure 9:
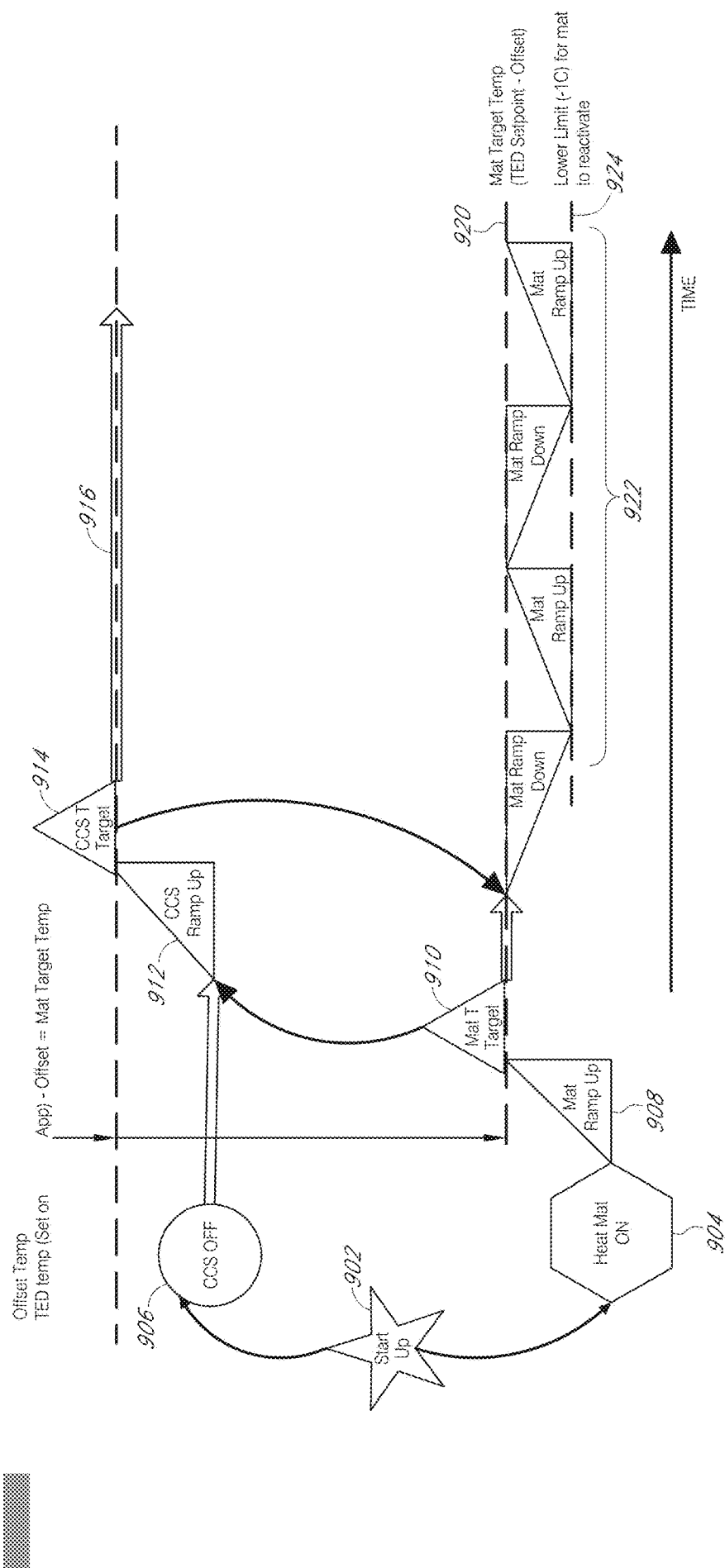
FIG. 9 is a schematic illustration of a control subroutine for a climate control system, according to an embodiment.

Another embodiment of a start up subroutine is illustrated in FIG. 9. In this embodiment, at start up 902, the control subroutine initially activates the thermal element 904. In some embodiments, as the thermal element 904 operates, the temperature of the thermal element ramps up 908 toward a thermal element target temperature 910. At this target temperature 910, the fluid module 906, which is initially deactivated, is instructed to be activated and to operate. As the fluid module 906 operates, the temperature of the fluid module increases 912 toward a fluid module target temperature 914 and continues to maintain operation at the fluid module target temperature 916. In some embodiments, at this time, the thermal element 904 is instructed to operate in an oscillating, cycling and/or other non-constant or varying operation 922. During such a varying (e.g., oscillating) mode of operation, the thermal element 904 can be turned on and off (or modulate between a low and high operating level) to maintain the temperature of the thermal element 904 between a maximum thermal element target temperature 920 and a minimum thermal element target temperature 924. In some embodiments, the maximum thermal element target temperature 920 may be offset from the fluid module target temperature 914 by a predetermined amount. For example, in some embodiments, this predetermined amount can be between 1 degree Celsius and 20 degrees Celsius. In some arrangements, it may be advantageous to initially operate the thermal element 904, as the thermal element 904 can raise the temperature more quickly than the fluid module 906. Further advantages in power consumption may be achieved by operating the thermal element 904 in an oscillating operation as shown in FIG. 9.

Figure 10:
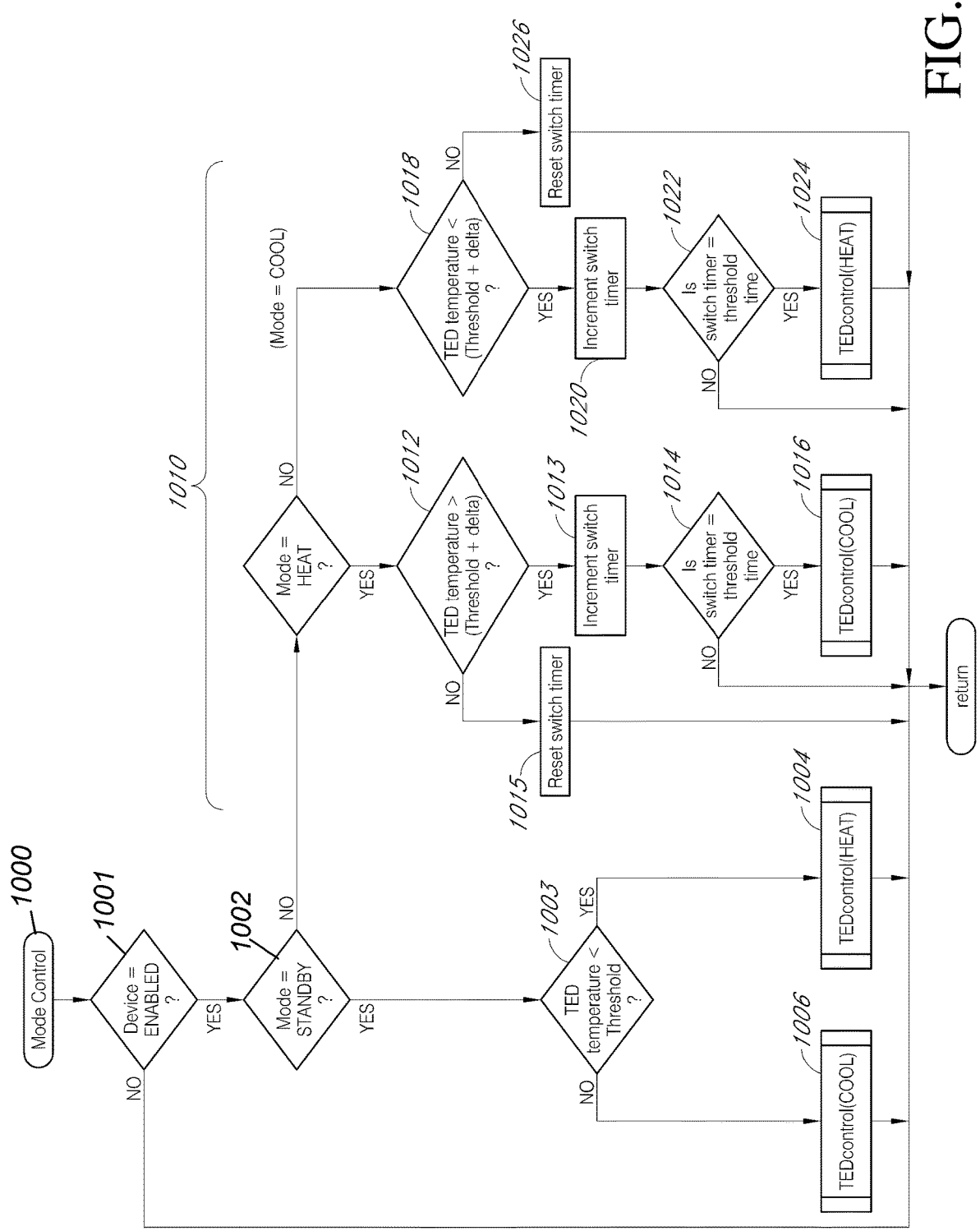
FIG. 10 is a flow chart illustration of a control subroutine for a climate control system, according to an embodiment.

A flow diagram illustrating one embodiment of a mode control subroutine for the fluid conditioning module is illustrated in FIG. 10. According to some embodiments, the mode control subroutine determines the mode of operation (e.g., heating mode or cooling mode) based on the respective set point temperature and measured temperature. Upon initialization of a mode control subroutine 1000, the control system first determines whether the device 1001 is enabled. If the device is enabled, the mode control subroutine can determine a mode of operation at start up (start up control periods) and during periods after the set point is initially achieved (set point control periods), as shown in FIG. 10. For example, during start up control periods such as start up control period 1002, the mode control subroutine initially selects the heating mode 1004 when the measured temperature is less than the set point temperature (as indicated by decision block 1003), and the cooling mode 1006 when the measured temperature is greater than the set point temperature (as indicated by decision block 1003). In some embodiments, during set point control periods, such as set point control periods 1010, the mode control subroutine switches operation from the heating mode to the cooling mode when the measured temperature exceeds the set point temperature by a predetermined amount (e.g., a temperature difference or delta, Δ) (as indicated by decision block 1012) for a predetermined time period (e.g., threshold time) (as indicated by decision block 1014) after operation of an increment switch timer 1013. If the measured temperature does not exceed the set point temperature by a predetermined amount, the switch timer may be reset as indicated by block 1015. In some embodiments, during set point control periods, such as set point control periods 1010, the mode control subroutine switches operation from the cooling mode to the heating mode 1024 when the measured temperature is below the set point temperature plus a predetermined amount (e.g., a temperature difference or delta, Δ), as indicated by decision block 1018, for a predetermined time period (e.g., threshold time), as indicated by decision block 1022, after operation of an increment switch timer 1020. If the measured temperature exceeds the set point temperature by a predetermined amount, the switch timer may be reset as indicated by block 1026. In some embodiments, when the set point is lowered during periods when heat is supplied to the seat, it is possible for the fluid conditioning modules to operate in a cooling mode. By way of example, a temperature delta (Δ) equal to about 2 degrees Celsius and a threshold time equal to 6 seconds were found to be suitable. However, in other embodiments, the temperature delta (Δ) and/or the threshold time can be greater or smaller than 2 degrees C. and 6 seconds, respectively.

In some arrangements, as shown in FIG. 9, the warm up control routines operate the resistive heater mat alone until its measured temperature reaches a predetermined target temperature within a predetermined temperature offset of the set point temperature. In one example, the set point temperature offset is about 20 degrees Celsius. However, in other embodiments, the set point temperature offset is less than 20 degrees Celsius (e.g., 5-10, 10-15, 15-20 degrees C., less than about 5 degrees C., values within the foregoing ranges, etc.) or greater than 20 degrees Celsius (e.g., 20-25, 25-30, 30-35, 35-40 degrees C., greater than 40 degrees, values within the foregoing ranges, etc.). The offset can vary based on, at least in part, the varying temperature feedbacks in the seat and/or the fluid module and/or other factors. For example, in some embodiments, the offset varies based on, at least in part, the ambient conditions (e.g., ambient temperature) in which the seat is positioned. The cool down control subroutines can operate the fluid conditioning module alone until the measured temperature of the TED and/or another measured temperature (e.g., temperature of the conditioned air) reaches a predetermined target temperature corresponding to the set point temperature. In one example, the target temperature is equal to the set point temperature.

The set point control subroutines cooperate to operate the devices in each of the seat cushion and the seat back so as to maintain their respective surfaces at or near their respective set points. In some embodiments, the set point control subroutines include a cooling mode set point control subroutine and a heating mode set point control subroutine, as illustrated, for example, in FIG. 10. The cooling mode subroutines operate the fluid conditioning devices alone to maintain the measured temperature of the conditioned air within a predetermined temperature of the set point temperature using feedback control. In one example, the feedback control is a proportional feedback control using a measured temperature of the TED. The heating mode set point control subroutine can operate both the resistive heater mat and the fluid conditioning module alone or in combination based on the measured temperature of the resistive heater mat. In some embodiments, when the measured resistive heater mat temperature first reaches the target temperature at the end of the warm up period, control discontinues operation of the resistive heater mat and begins operating the fluid conditioning module at its target temperature. In some embodiments, control begins operating the resistive heater mat when the measured temperature of the resistive heater mat drops a predetermined amount (e.g., set point temperature delta, Δ) below its target temperature. In one example, the set point temperature delta is about 1 degree Celsius. Control may operate the resistive heater mat and the fluid conditioning module at the same time until the resistive heater mat reaches its target temperature, when control shuts off the resistive heater mat yet continues operation of the fluid conditioning module.

According to some embodiments, the fluid conditioning module may have a maximum achievable target temperature which is less than the set point temperature due to its cooling mode optimization. During periods when the set point temperature is greater than the maximum target temperature, the measured temperature of the resistive heater mat may begin to drop.

Figure 11:
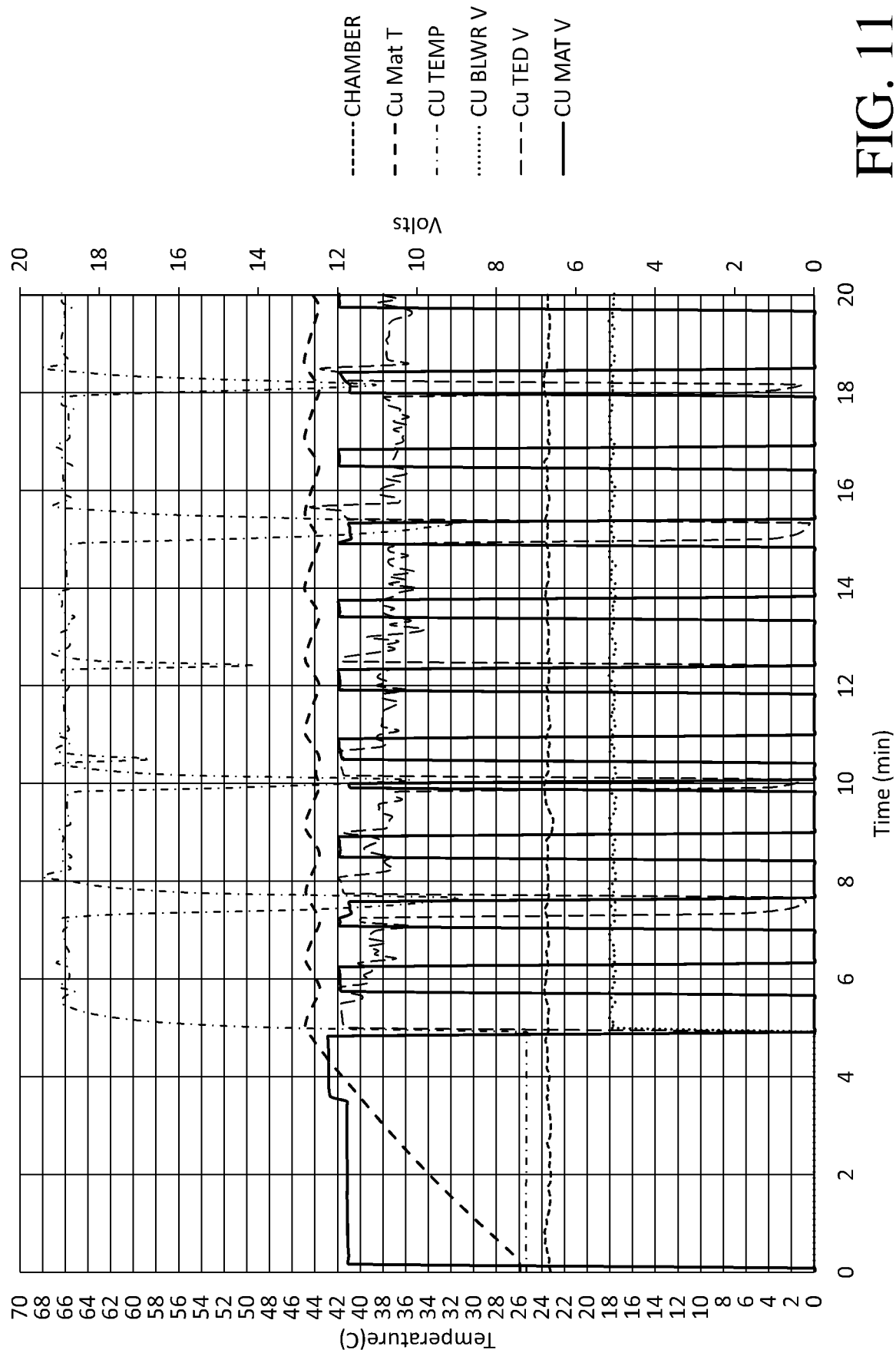
FIG. 11 is a graphical illustration of temperatures and voltages resulting from operation of a climate control system subroutine, according to an embodiment.
Figure 12:
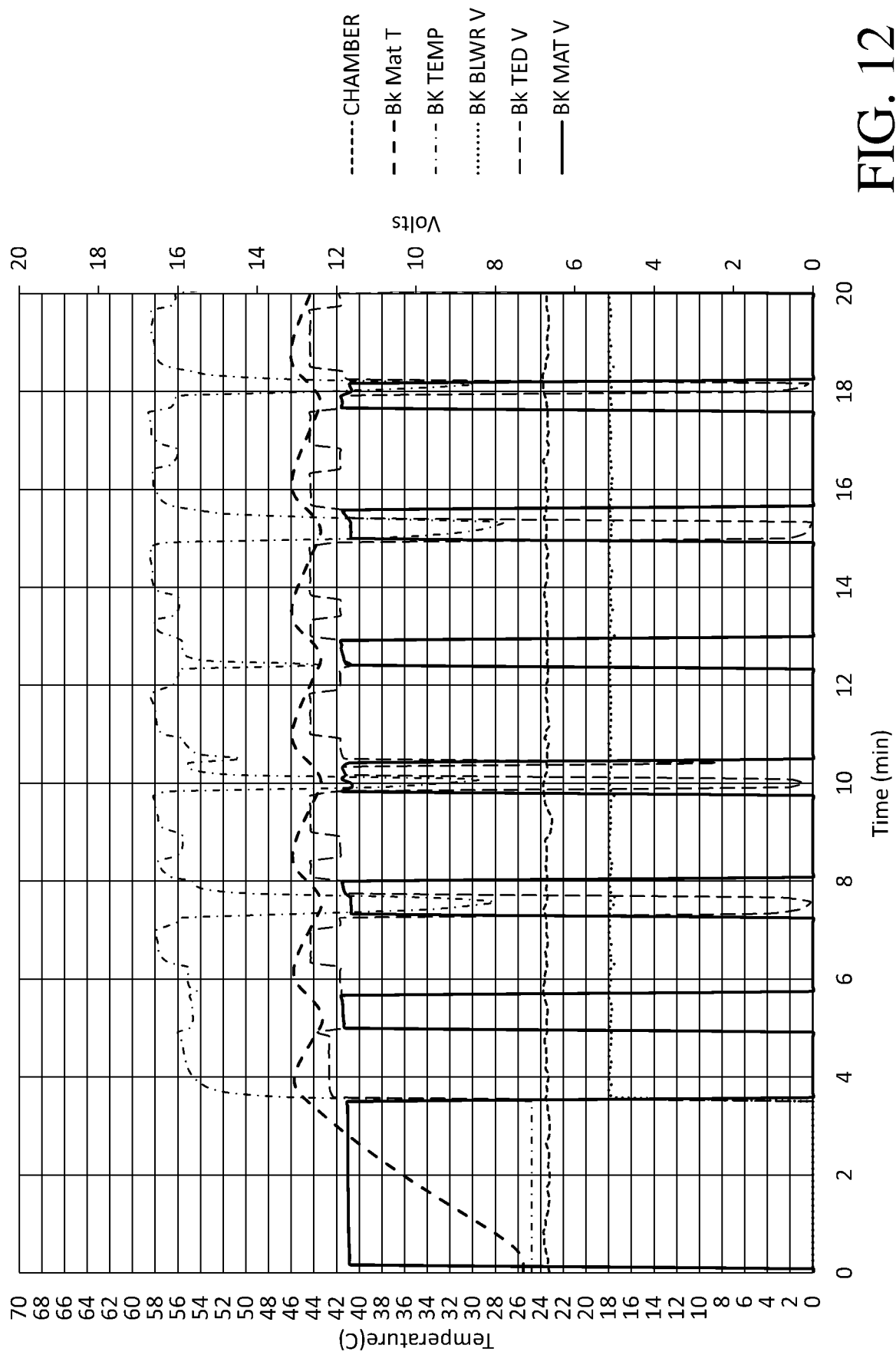
FIG. 12 is a graphical illustration of temperatures and voltages resulting from operation of a climate control system subroutine, according to an embodiment.

Various features of the control system are illustrated in the embodiments shown in FIGS. 11-17. In these embodiments, a resistive heater mat and/or other thermal element (e.g., conductive heating device or component) target temperature is offset from a cushion setpoint temperature by a predetermined amount, such as, for example, 20 degrees Celsius. In other embodiments, the target temperature may be offset from a cushion setpoint temperature by 10-30 degrees, 10-12 degrees, 12-14 degrees, 14-16 degrees, 16-20 degrees, 20-25 degrees, or 25-30 degrees Celsius. Oscillating operation of the resistive heater mat occurs between this heater mat target temperature and a minimum operating temperature that may be offset from the heater mat target temperature by 1 degree Celsius. Selection of the predetermined temperature offsets may vary in other embodiments but are desirably chosen to minimize amount of temperature variation detected by the user. As illustrated in FIGS. 11 and 12, the resistive heater or heater mat initially operates to the heater mat target temperature at which point the fluid module, including a thermoelectric device, is turned on. The resistive heater or heater mat then begins an oscillating operation to better optimize power consumption of the system. In some embodiments, the voltage of the seat climate control system is maintained around 12 V.

Figure 13A:
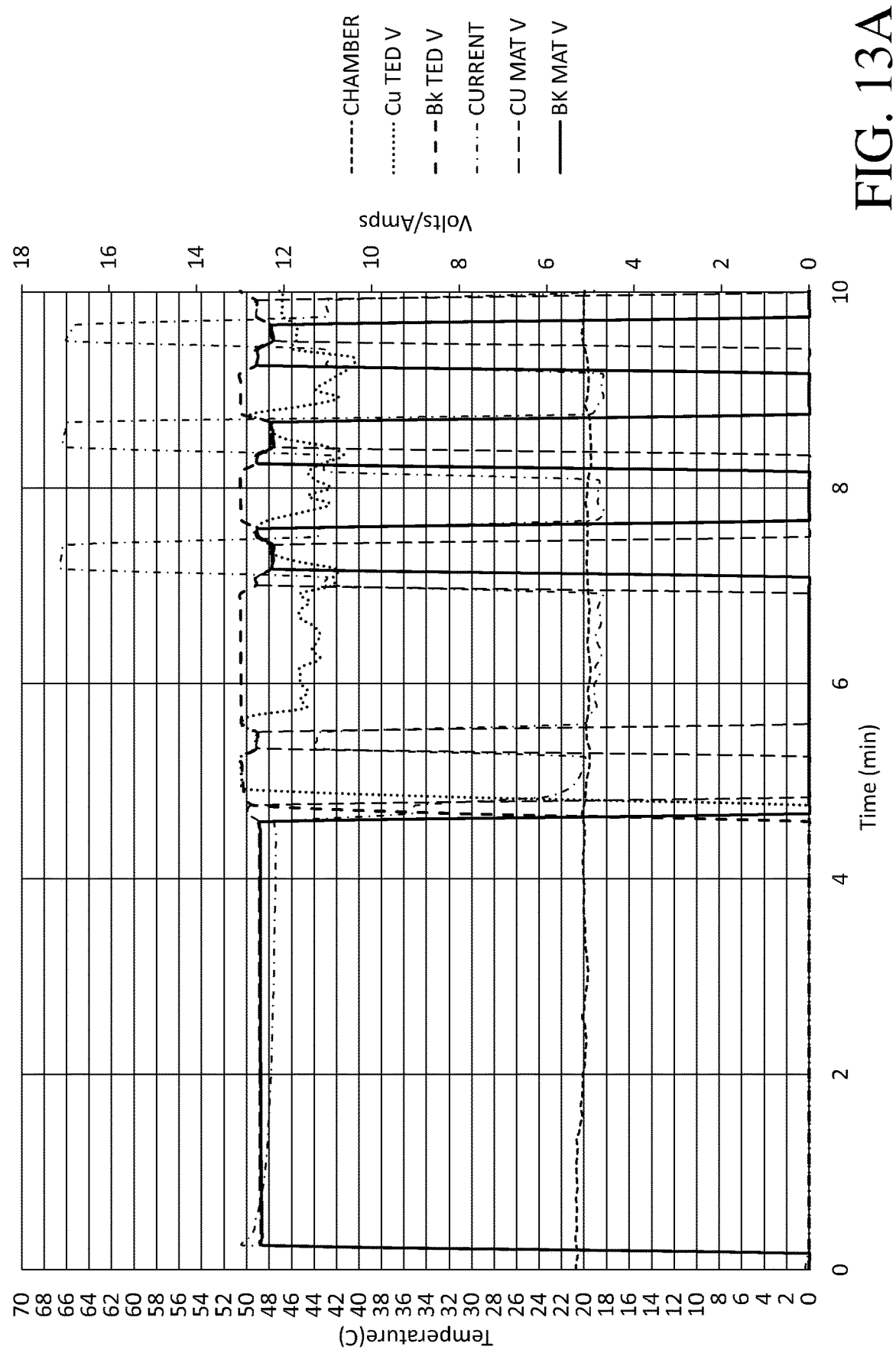
FIGS. 13A and 13B are graphical illustrations of operation of a climate control system in a heating mode without power shedding control.
Figure 13B:
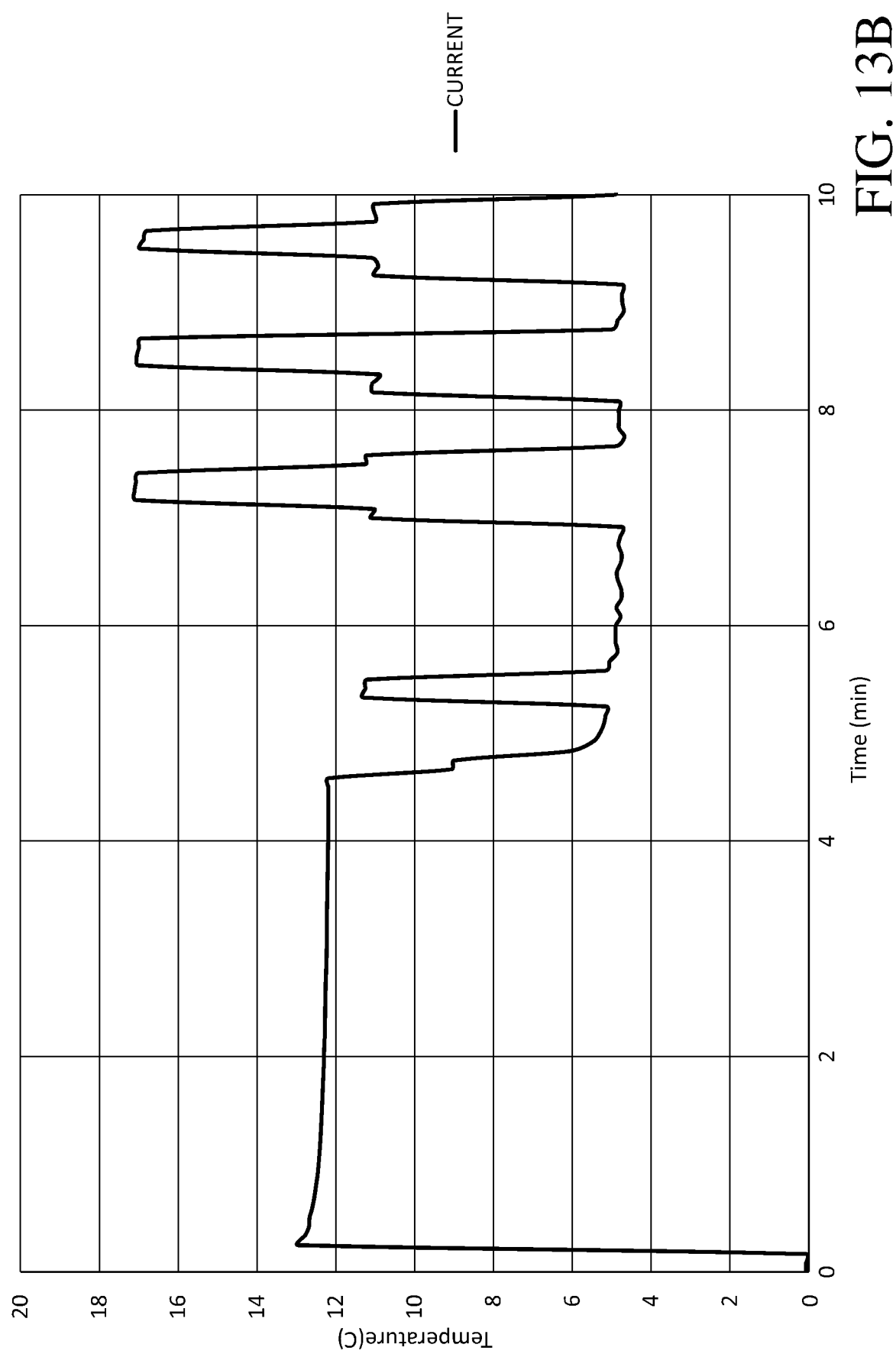
Figure 14A:
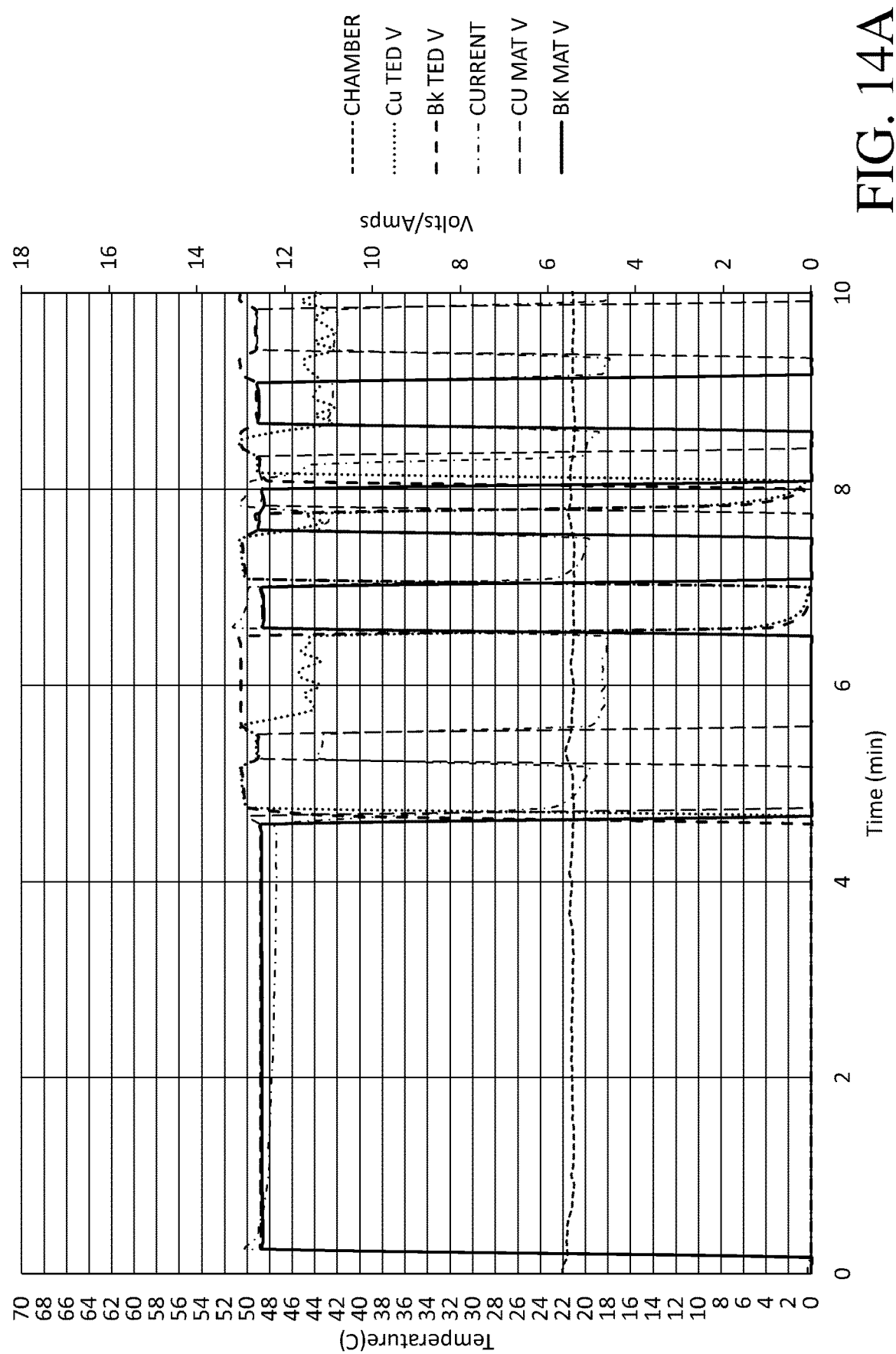
FIGS. 14A and 14B are graphical illustrations of operation of a climate control system in a heating mode with power shedding control.
Figure 14B:
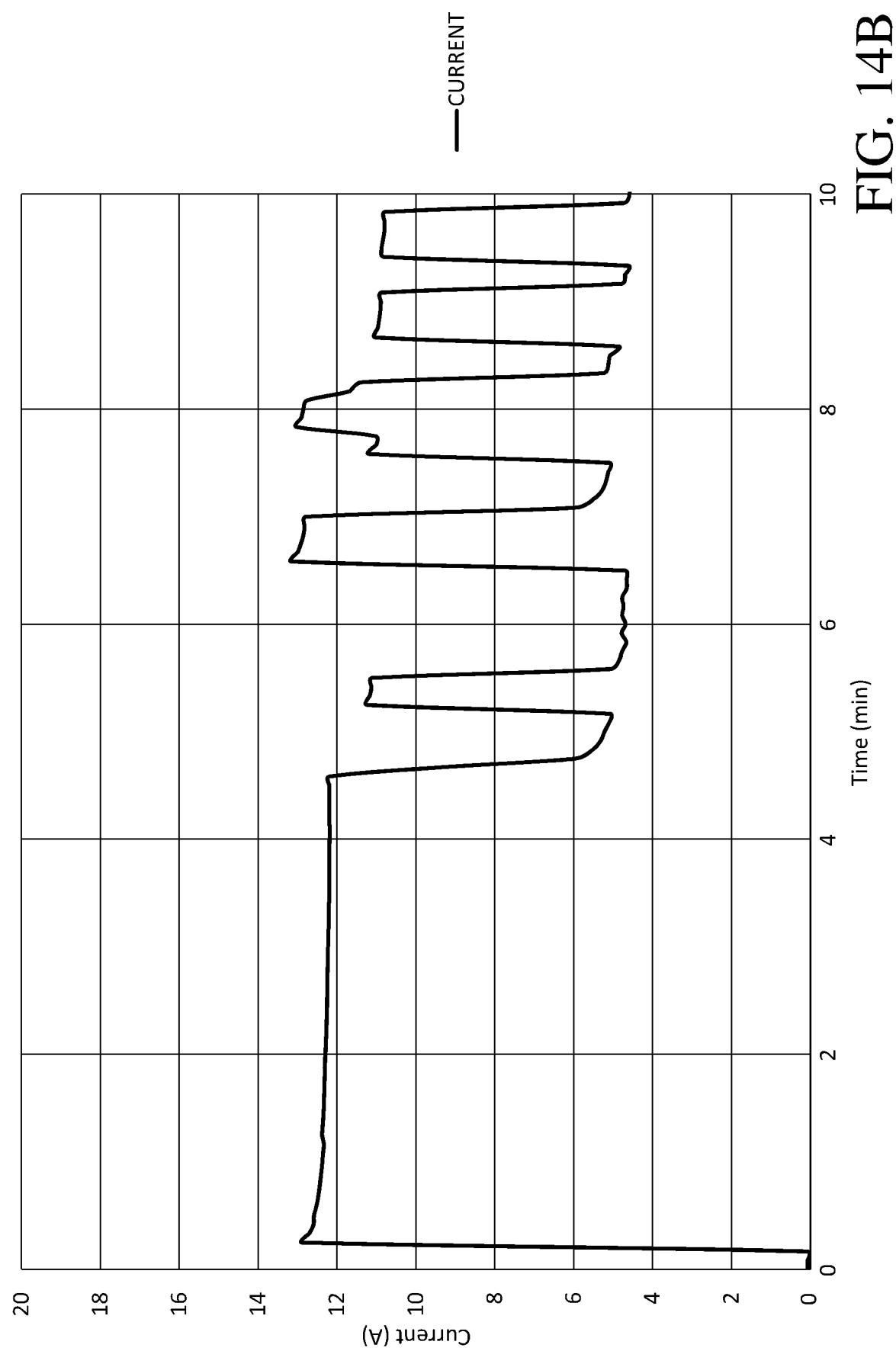
Figure 15:
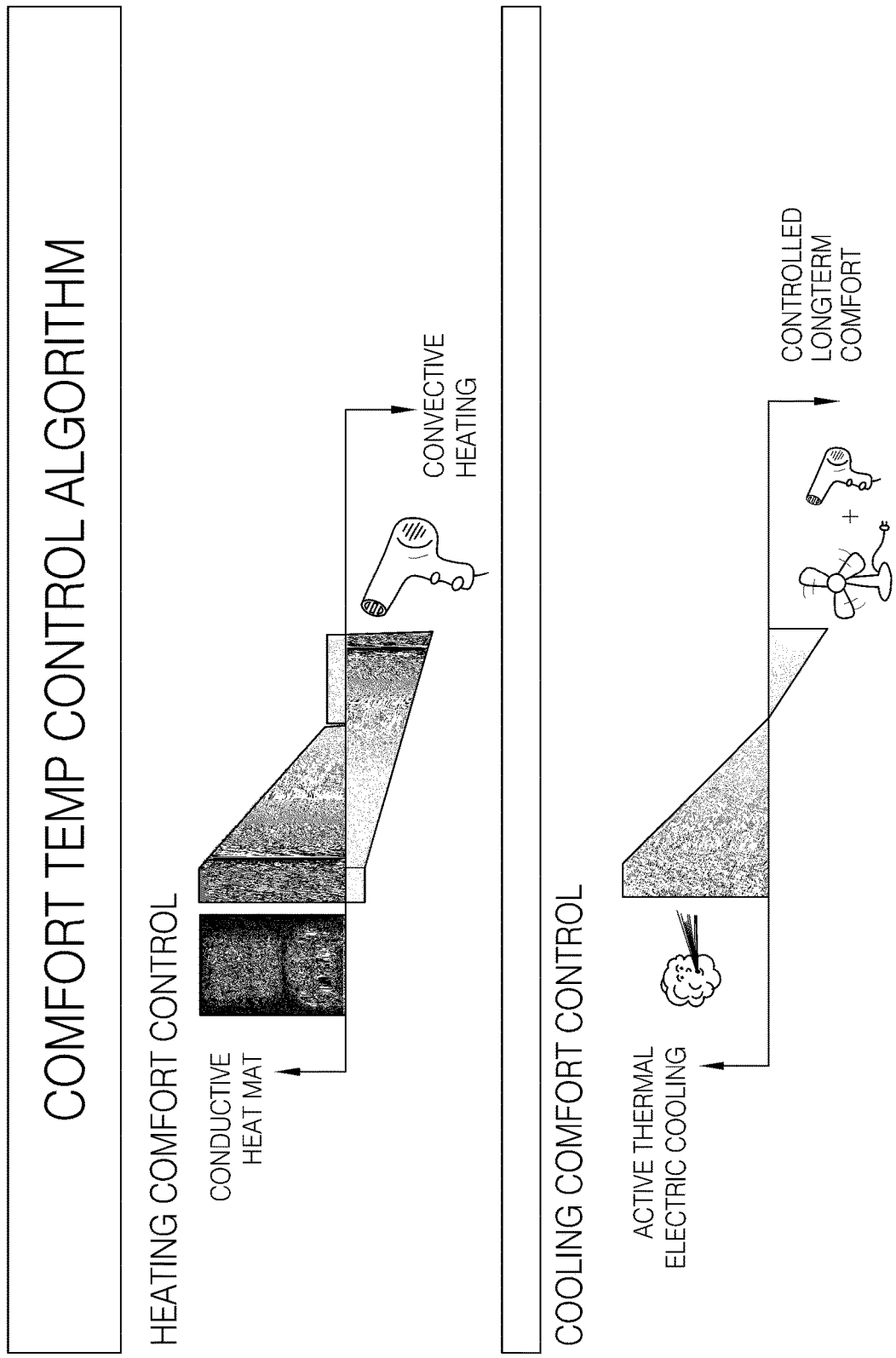
FIG. 15 is a schematic illustration of a climate control system, according to an embodiment.

In some embodiments, such as those illustrated in FIGS. 13A, B and 14A, B, a watchdog power shedding control limits the total power consumption of the seat climate control system by shutting down one or more of the devices. In one example, control shuts off the fluid conditioning modules during periods when both the resistive heaters are operating. FIGS. 13A and B illustrate operation of the seat climate control system without power shedding control while FIGS. 14A and B illustrate operation of the seat climate control system with power shedding control. As illustrated in FIGS. 14A and B, turning off the thermoelectric device of the fluid module when both of the resistive heaters in the seat and back cushions are operating eliminates the high current spikes observed in FIGS. 13A and B. In some embodiments, the power shedding control measures a total power consumed by the conductive heating element, the fluid supply device and the convective temperature conditioning device and deactivates at least one of the conductive heating element, the fluid supply device and the convective temperature conditioning device when the total power exceeds a predetermined power. By measuring the total power consumed by the heating elements and fluid module, the total power consumed can be managed such that the power consumed does not exceed a predetermined power.

Improvements to the seat climate control system also include using a smartphone (e.g., iPhone) application to control the control system of the climate controlled seat. In some embodiments, the control units for the climate controlled seats can communicate with smartphones wirelessly (e.g., using Bluetooth, Wi-Fi, any other wireless protocol, etc.). Thus, the smartphone application can provide for more customized control of the climate controlled seat. For example, in some embodiments, the application can allow a user to individually control the temperature, temperature range and/or setting of the seat bottom and seat back portions of the seat assembly. Further, the application can provide feedback (e.g., real time feedback) regarding temperature and/or other measurements obtained by sensors included or associated with the climate controlled system (e.g., relative humidity, presence of condensate, etc.). Instead of asking the user to set a HI/MED/LOW control setting, an application for a mobile device (such as a smartphone) may allow the user to independently control the level of heating or cooling to the back and/or the seat cushions, including heating one of the back or seat cushions and cooling the other of the back or seat cushions and vice versa. A smartphone application may further allow for independent setting of the temperature and the blower speed of the seat climate control system. In some embodiments, blower control may be enabled to allow the thermoelectric device to heat up when the system is operating in heating mode or allow enough waste heat to be removed when the system is operating in cooling mode.

The climate control system has several advantages over conventional systems including, but not limited to quick conductive heat up, long term convective heated comfort, independent seat back and seat cushion control, intelligent closed loop heating and cooling control. The climate control system also includes TEDs optimized for cooling, which advantageously operate at voltages within a typical voltage range of automotive vehicles in both a heating and cooling modes. Additional benefits and advantages to the embodiments disclosed herein exist.

Figure 16:
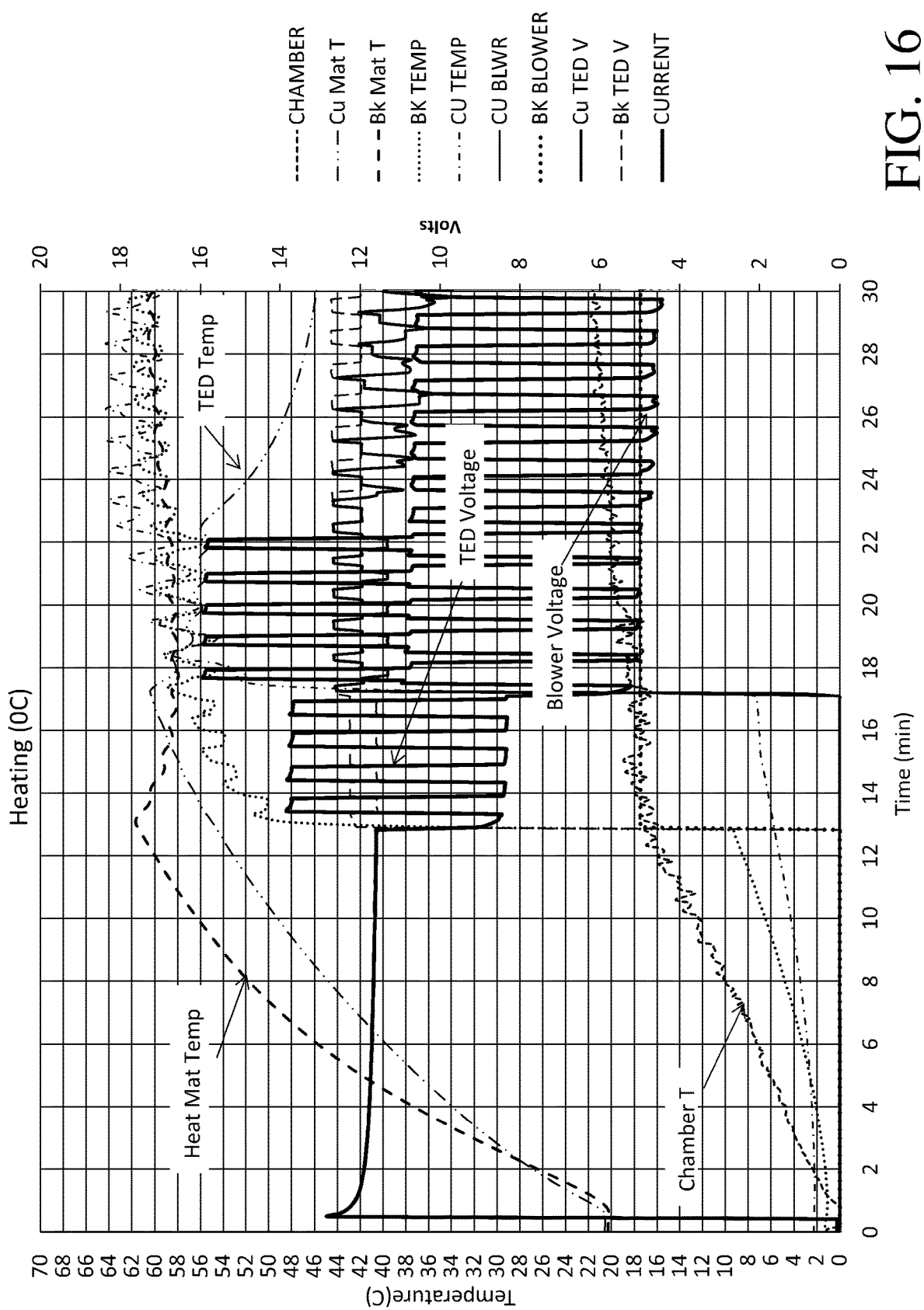
FIG. 16 is a graphical illustration of operation of a climate control system in a heating mode, according to one embodiment.
Figure 17:
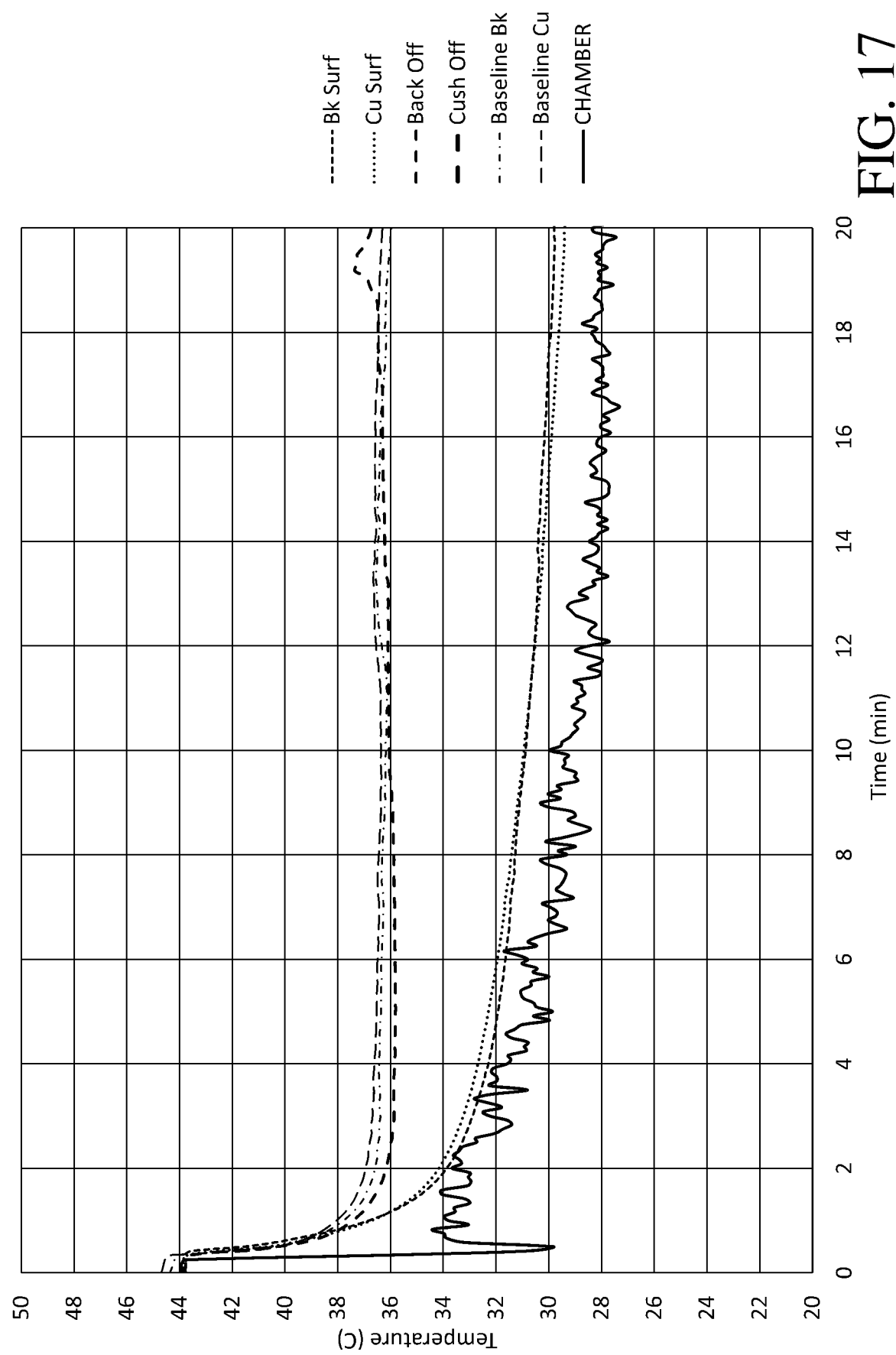
FIG. 17 is a graphical illustration of operation of a climate control system in a cooling mode, according to one embodiment.

FIGS. 16-17 provide additional disclosure of embodiments related to the present control features for climate controlled seat assemblies. As discussed above, in some embodiments, the oscillating operation with power shedding control subroutines can desirably result in faster heating times and optimized or improved power consumption. In some embodiments, various modifications may be made to the vehicle seats or other seats to provide for enhanced or improved conductive and/or convective thermal conditioning (e.g., modifying the volume of spacer fabric or other material, creating holes or other openings between massage bladders, replacing filler foam with spacer fabric or other material, replacing high PPI reticulated foam with low PPI reticulated foam, removing foam laminated to leather hide to open or expose perforations, adding holes near the ischia area of the seat, replacing filler foam on A-side with spacer fabric or other material, etc.).

To assist in the description of the disclosed embodiments, words such as upward, upper, downward, lower, vertical, horizontal, upstream, and downstream have been used above to describe the accompanying figures. It will be appreciated, however, that the illustrated embodiments can be located and oriented in a variety of desired positions.

In the above description, various components are described as being associated with the "back" or "seat" cushion. In modified embodiments, it should be appreciated that the subcomponents of the back and seat cushions may be reversed and/or made to the same. In still other embodiments, the various components of the illustrated embodiments may be combined and/or may be applied to different zones of a seat, such as, for example, a top and bottom portion of a backrest portion. In other embodiments, the features of the back and seat cushions may be applied to different zones of an occupant area that are to be thermally conditioned, such as, for example, back and rear seat assemblies or left and right seat assemblies.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a user; however, they can also include any third-party instruction of those actions, either expressly or by implication. For example, actions such as "directing" or "activating" include "instructing directing" or "instructing activating," respectively. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present inventions should not be limited by the foregoing discussion, which is intended to illustrate rather than limit the scope of the inventions.

What is claimed is:

1. A method for thermally conditioning a space adjacent a seat assembly that includes a support structure that defines a support surface, the method comprising:
    during a first conditioning mode or period, activating a conductive heating element positioned within, along, or below the support surface until a first target temperature is reached, thereby conductively heating the support surface;
    during a second conditioning mode or period, activating a fluid module that includes a fluid supply device and a convective temperature conditioning device until a second target temperature is reached, wherein in the second conditioning mode or period, the fluid supply device provides air to the convective temperature conditioning device and the convective temperature conditioning device heats air;
    directing heated air from the fluid module to the support surface through a distribution system formed at least partially in a seat cushion supported by the support structure to convectively heat a space adjacent the support surface; and
    when the first target temperature is reached, deactivating the conductive heating element;
    wherein the first conditioning mode or period precedes or is used concurrently with the second conditioning mode or period; and
    wherein the conductive heating element is configured to be cycled at least twice between at least two different levels between a maximum conductive heating element target temperature and a minimum conductive heating element target temperature during operation of the second conditioning mode or period.

2. The method of claim 1, wherein the conductive heating element is a resistive heating element.

3. The method of claim 1, wherein the convective temperature conditioning device includes a thermoelectric element.

4. The method of claim 1, wherein the seat assembly is located within a vehicle.

5. The method of claim 1, further comprising activating, using a control module, at least one of the conductive heating element, the fluid supply device and the convective temperature conditioning device when a temperature adjacent the seat assembly falls below a target desired temperature.

6. The method of claim 1, further comprising generating heat within a space beneath a seat covering of the seat assembly using at least one of the conductive heating element, the fluid supply device , or the convective temperature conditioning device.

7. The method of claim 1, further comprising generating heat within a space beneath a seat covering of the seat assembly and above the seat cushion of the seat assembly using at least one of the conductive heating element, the fluid supply device, or the convective temperature conditioning device.

8. The method of claim 1, wherein the step of activating the fluid module begins at least 60 seconds after the conductive heating element has been activated.

9. The method of claim 1, wherein the conductive heating element and the fluid module are both activated during a period of time and during the period of time, a total current supplied to the conductive heating element and the convective temperature conditioning device remains constant.

10. The method of claim 1, wherein:
if an ambient temperature is less than a threshold temperature, the seat assembly is configured to concurrently operate under both the first conditioning mode or period and the second conditioning mode or period; and
if the ambient temperature is above the threshold temperature, the seat assembly is configured to operate one of the first conditioning mode or period and the second conditioning mode or period.

11. The method of claim 1, wherein when the first and second conditioning modes or periods are operating concurrently with one another and if an ambient temperature rises above a threshold temperature, the seat assembly is configured to begin cycling operating between the first conditioning mode or period and the second conditioning mode or period.

12. The method of claim 1, further comprising:
measuring a total power consumed by the conductive heating element, the fluid supply device and the convective temperature conditioning device; and
deactivating at least one of the conductive heating element, the fluid supply device and the convective temperature conditioning device when the total power exceeds a predetermined power.

13. The method of claim 1, wherein the conductive heating element is configured to be cycled at least twice between being turned on and off after operation of the first conditioning mode or period.

14. A method of thermally conditioning a climate controlled seat assembly using feedback control, comprising:
receiving instructions regarding a desired operational setting for the seat assembly;
sensing a temperature associated with a level of thermal conditioning occurring at the seat assembly using at least one temperature sensor;
providing the desired operational setting and the sensed temperature to a control module;
wherein the control module is adapted to selectively regulate a heating element and a fluid module to thermally condition a space adjacent the seat assembly based on the desired operational setting and the sensed temperature, the fluid module comprising a fluid transfer device and a thermoelectric device;
activating or deactivating at least one of the heating element, the fluid transfer device and the thermoelectric device using the control module; and
cycling the heating element at least twice between at least two different levels during operation;
wherein the heating element is positioned near a support surface of the seat assembly and is configured to conductively heat the support surface;
wherein the fluid module is configured to selectively direct heated or cooled air through a fluid distribution system at least partially formed within a seat cushion of the seat assembly, the seat cushion supported by a support structure of the seat assembly, to convectively heat or cool a space adjacent the support surface;
wherein the control module is adapted to selectively activate or deactivate at least one of the heating element, the fluid transfer device and the thermoelectric device to maintain the desired operational setting; and
wherein the control module is configured to receive a signal that indicates a status of an ignition system of a vehicle comprising the seat assembly, the control module being adapted to activate at least one of the heating element, the fluid transfer device and the thermoelectric device when the ignition system is turned on.

15. The method of claim 14, wherein the desired operational setting for the climate controlled seat assembly corresponds to a general temperature setting.

16. The method of claim 14, wherein the desired operational setting for the climate controlled seat assembly corresponds to a specific temperature or temperature range.

17. The method of claim 14, wherein the seat assembly comprises a seat back portion and a seat bottom portion, wherein the desired operational setting for the seat back portion is different that the desired operational setting for the seat bottom portion.

18. A method of thermally conditioning a climate controlled seat assembly using feedback control, comprising:
receiving instructions regarding a desired operational setting for the seat assembly;
sensing a temperature associated with a level of thermal conditioning occurring at the seat assembly using at least one temperature sensor;
providing the desired operational setting and a sensed temperature to a control module;
selectively regulating a heating element and a fluid module to thermally condition a space adjacent the seat assembly using the control module, the seat assembly comprising a seat cushion to which the space is adjacent, the fluid module comprising a fluid transfer device and a thermoelectric device; and
operating at least one of the heating element and the fluid module in a heating mode of operation when the sensed temperature is less than a desired set point temperature, wherein the heating element is configured to be cycled at least twice between at least two different levels during operation of the heating mode;
operating at least one of the heating element and the fluid module in a cooling mode of operation when the sensed temperature is more than the desired set point temperature;
switching operation of at least one of the heating element and the fluid module from a heating mode of operation to a cooling mode of operation when the sensed temperature exceeds the desired set point temperature by a predetermined delta for a predetermined time period; and
switching operation from a cooling mode of operation to a heating mode of operation when the sensed temperature is below the desired set point temperature by a predetermined delta for a predetermined time period.

19. The method of claim 18, wherein the predetermined delta is 2 degrees Celsius.

20. The method of claim 18, wherein the predetermined time period is 6 seconds.

21. The method of claim 18, wherein the heating element is operated alone until a measured temperature of the heating element reaches a predetermined target temperature.

22. The method of claim 21, wherein the predetermined target temperature is within a predetermined temperature offset of the desired set point temperature.

23. The method of claim 22, wherein the predetermined temperature offset is 20 degrees Celsius.

24. The method of claim 17, wherein operation of the heating element is discontinued and operation of the fluid module is initiated when a predetermined target temperature is reached.

25. The method of claim 17, wherein operation of the heating element is discontinued when the fluid module is in operation.

* * * * *